(12) United States Patent
Tsujimoto

(10) Patent No.: US 6,614,435 B1
(45) Date of Patent: Sep. 2, 2003

(54) METHOD OF CONTROL OF PLAYBACK OF MOTION AND PROGRAM PRODUCT AND GAME SYSTEM FOR SAME

(75) Inventor: Kenro Tsujimoto, Osaka (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 134 days.

(21) Appl. No.: 09/583,045

(22) Filed: May 30, 2000

(30) Foreign Application Priority Data

Sep. 22, 1999 (JP) .......................................... 11-268449

(51) Int. Cl.⁷ .............................................. G06T 11/00
(52) U.S. Cl. ...................... 345/473; 345/474; 345/475; 345/955; 345/960
(58) Field of Search ................................ 345/473–475, 345/706, 707, 951, 955, 957, 960; 463/31, 32

(56) References Cited

U.S. PATENT DOCUMENTS 6,246,420 B1 * 6/2001 Mochizuki et al. ......... 345/474

FOREIGN PATENT DOCUMENTS

| JP | 06259512 | 9/1994 |
| JP | 10302088 | 11/1998 |
| JP | 11144084 | 5/1999 |
| JP | 11219445 | 8/1999 |

OTHER PUBLICATIONS

Thalmann et al., "Interactive Computer Animation" pp4–9, 1996.*
An English Language abstract of JP 10–302088.
An English Language abstract of JP 11–144084.
English Language Abstract of JP 11–144084.
English Language Abstract of JP 11–219445.
English Language Abstract of JP 06–259512.

* cited by examiner

*Primary Examiner*—Almis R. Jankus
(74) *Attorney, Agent, or Firm*—Greenblum & Bernstein, P.L.C.

(57) ABSTRACT

A method of control of playback of motion for playing back motion of a character more realistically, including determining a motion playback routine in accordance with a value of a parameter expressing the condition of the character, for example, a stress value reflecting the cumulative amount of a plurality of instances of damage and being restored along with the elapse of time after damage is sustained, when a factor affecting movement of the character or an incident in the game arises due to another game element during the playback of the motion of the character, for example, when being attacked by another character; playing back new motion in accordance with the determined routine; and playing back motions B and C based on motion data stored in advance when the stress value is "large" or "intermediate" and combining the motion data defining the motion being played back and other motion data stored in advance when the stress value is "small".

17 Claims, 14 Drawing Sheets

| HP_NOW | 56 | 91a |
| --- | --- | --- |
| HP_MAX | 120 | 91b |
| MP_NOW | 38 | 91c |
| MP_MAX | 60 | 91d |
| ST | 200 | 91e |
| POSITION DATA | X, Y, Z | 91f |
| DIRECTION DATA | $\alpha, \beta, \gamma$ | 91g |

| KEY FRAME | | MOTION DATA |
|---|---|---|
| 1 | E1 | (X11, Y11, Z11) — 200<br>(α11, β11, γ11) — 201 |
| | E2 | (X12, Y12, Z12) — 202<br>(α12, β12, γ12) — 203 |
| | ... | ... |
| ... | | ... |
| L | | ... |

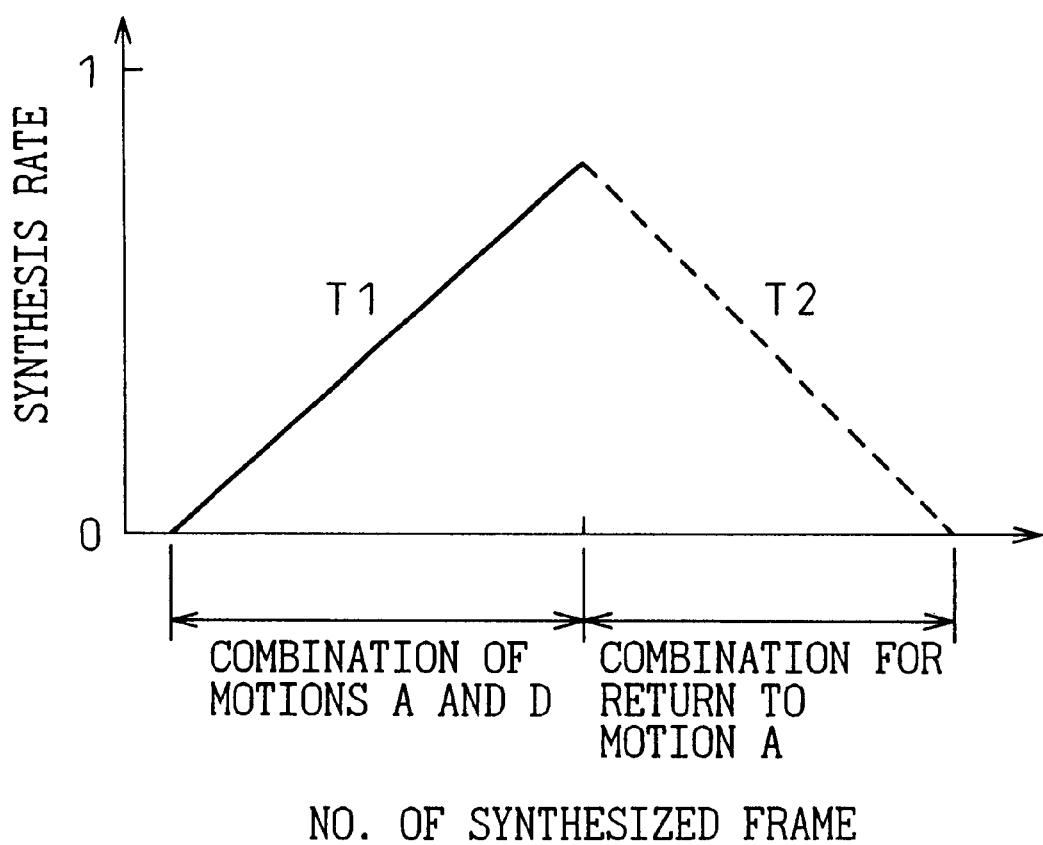

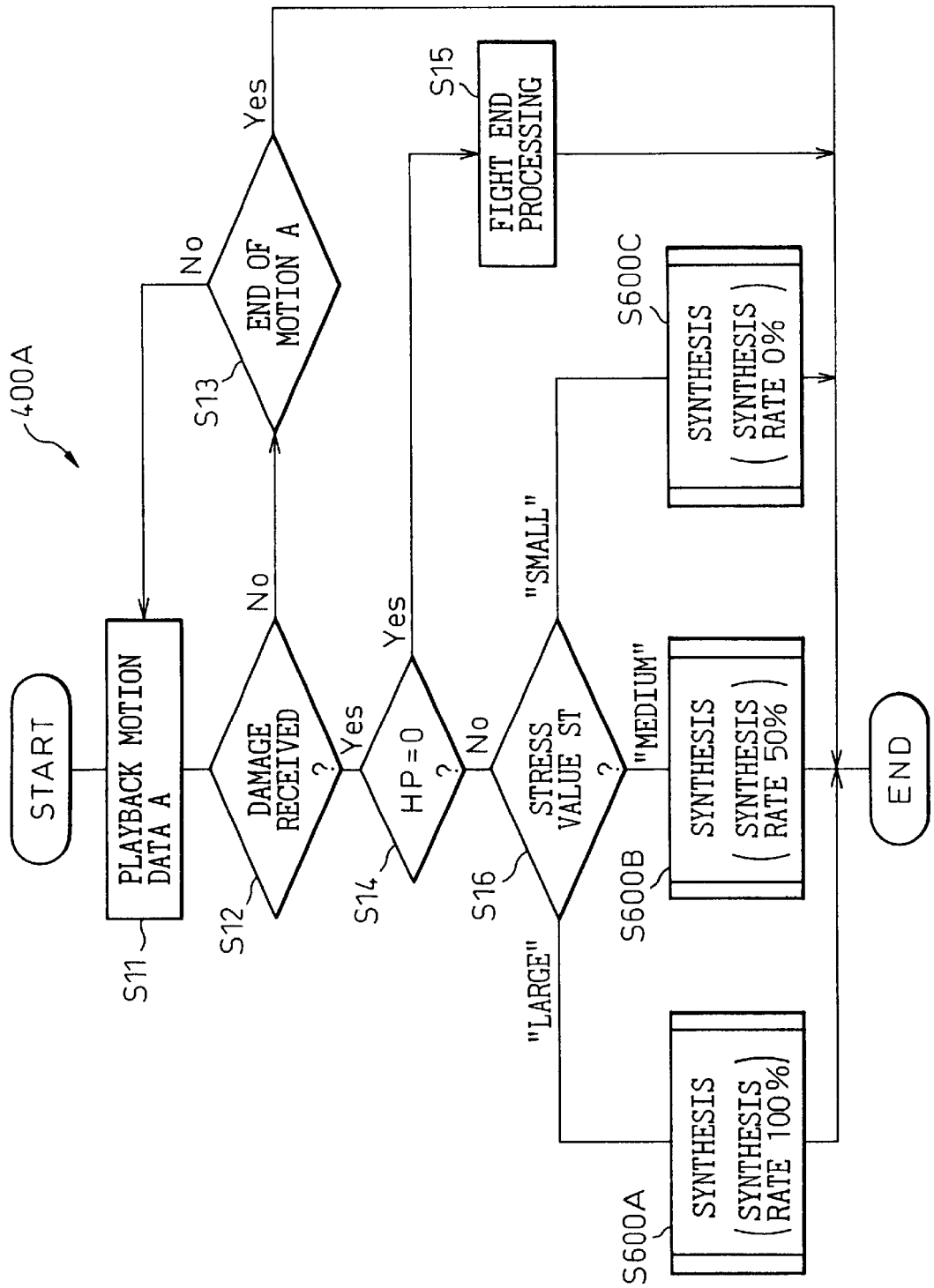

METHOD OF CONTROL OF PLAYBACK OF MOTION AND PROGRAM PRODUCT AND GAME SYSTEM FOR SAME

BACKGROUND OF THE INVENTION

1. Field of the Invention

The present invention relates to a method of control of playback of motion for controlling the display of an image expressing motion of a virtual being on a game screen and to a program product storing a program and a game system using the same.

2. Description of the Related Art

Recent 3D games etc. include ones which position a virtual being called a "3D character" in a virtual 3D space and generate an image of the field of vision as seen from a predetermined perspective for the display on the screen. For example, in a role playing game, a virtual being called a "player character" and one or more other virtual beings called "enemy characters" are sometimes used. Usually, the image expressing a character is comprised of a plurality of polygons corresponding to a plurality of parts expressing the-head, shoulders, limbs, torso, etc. of the character (hereinafter called "arcs").

Generation of an image of a character in a game requires use of a set of data expressing the positions and angles of these arcs in each frame. Expression of a series of movements of a character spanning several frames requires use of a series of sets of data corresponding to these frames. This series of movements is called "motion". The set of data expressing motion is called "motion data". Actual game systems store in advance motion data set corresponding to a plurality of movements which a player may desire to have the characters perform.

When desiring to have a character perform one of these movements, the motion data corresponding to that movement is used to continuously change the positions and angles of the arcs of the character and thereby have the movement of the character displayed on the screen. The motion data may be used to display movement of a character in a form close to actual movement. Use of motion data to display on a screen an image expressing movement of a character is called playback of character movement or motion or playback of motion data.

It has been proposed to not only use one set of motion data to express one movement of a character, but to also combine a plurality of sets of motion data to generate an image expressing a desired movement. For example, Japanese Unexamined Patent Publication (Kokai) No. 10-302088 proposes a technique for expressing a rich variety of movement without providing that many sets of motion data. This discloses the technique of combining a plurality of sets of motion data in different forms in accordance with the type of operational input of a player.

Japanese Unexamined Patent Publication (Kokai) No. 11-144084 proposes a technique of expressing smooth movement using a plurality of sets of motion data. This discloses the technique of switching the sets of motion data used for playback along with time so as to use frame images of successively different sets of motion data along with the elapse of time and thereby display movement smoother than when using a single set of motion data.

In conventional games, to give realism to the movement of a character, sometimes movement of the character is switched to other movement in the middle of playback of the movement of the character in accordance with the state of the game. For example, in a role playing game, when having an enemy character try to attack the player character, the enemy character is sometimes conversely attacked by the player character.

In this case, the movement of the enemy character is changed from movement for attack to movement after being attacked, for example, falling to the ground. In these games, movement is changed in this way by switching from motion data being played back to other motion data linked with attack by the player character in advance.

Note that when switching sets of motion data, sometimes a set of motion data before switching and a set of motion data after switching are used for interpolation for a certain period. Interpolation enables the abruptness of the change of the image during switching to be reduced by a certain extent. Switching of the motion being played back is required when the player character is trying to attack an enemy character and conversely when the player character is being attacked by an enemy character.

Summarizing the problems to be solved by the invention, movement of a character after switching is usually determined by the factor triggering the switch, in the present case, the type of the attack from another character. The same is true when a character is continuously attacked in the same way from another character.

In the real world, when one person is attacked in the same way by another person, the movement when attacked can take various forms depending on the extent of the damage caused to the person due to the attack or the cumulative damage sustained by that person. The person will fall to the ground at some times and will stagger back a bit at other times. Similarly, a character in a game is designed to change in condition with each instant along with the progress of the game.

Normally, the condition of a character is controlled by a plurality of types of parameters. For example, these include a parameter expressing the physical strength of the character and a parameter expressing its speed. These parameters linked with a character are updated in accordance with the progress of the game, so the condition of the character is designed to change with each instant.

The inventors thought that to enhance the realism of the game in the same way as the real world, it would be desirable to decide on the motion of a character to be played back in accordance with the condition of the character as it changes with each instant along with the progress of the game such as with one character being continuously attacked by another character.

SUMMARY OF THE INVENTION

An object of the present invention is to provide a method of control of playback of motion enabling movement to be performed by a character in a game after being attacked etc. by another character to be determined in accordance with the condition of the character as it changes along with the progress of the game.

Another object of the present invention is to provide a program product storing a program using the method of control of playback of motion.

A still further object of the present invention is to provide a game system using the method of control of playback of motion.

To achieve the above object, according to a first aspect of the present invention, there is provided a method of control of playback of motion comprising determining a motion playback routine from among a plurality of motion playback routines for playing back motion of a character based on motion data, expressing continuous change of an image of a character in a game, in accordance with a value of a parameter linked with the character when an event occurs in the game having an effect on movement being played back of the character in the middle of playing back motion of the character on a screen based on the motion data and playing back motion based on motion data corresponding to the determined motion playback routine in accordance with the motion playback routine after transition from the motion being played back.

Preferably, the plurality of motion playback routines include a plurality of motion playback routines combining motion data defining a motion being played back with other motion data by different synthesis rates and, in determining a motion playback routine, a motion playback routine using a synthesis rate corresponding to the value of the parameter is determined from among the plurality of motion playback routines for combination.

More preferably, the synthesis rate is determined for each of a plurality of pre-established ranges of values able to be taken by the parameter and, in determining a motion playback routine, a motion playback routine is determined which combines motion data by the synthesis rate established corresponding to the one of the plurality of ranges to which the value of the parameter belongs.

Alternatively, preferably, the plurality of motion playback routines include a plurality of motion playback routines for playing back motions based on corresponding motion data stored in advance different from the motion data defining motion being played back.

Alternatively, preferably, the plurality of motion playback routines include a first motion playback routine for playing back motion based on motion data stored in advance different from the motion data defining motion being played back and a second motion playback routine for processing the motion data stored in advance to generate other motion data and playing back other motion based on the generated other motion data.

More preferably, the motion being played back is played back based on motion data stored in advance, and the processing is processing for combining the motion data stored in advance of the motion being played back and at least one other set of motion data.

To achieve the above object, according to a second aspect of the present invention, there is provided a method of control of playback of motion comprising updating a parameter linked with a character in a game in accordance with progress in the game so that the character changes in accordance with cumulative damage sustained from another game element and recovers in accordance with the elapse of time after sustaining the damage and switching motion being played back to one of a plurality of other motions in accordance with the value of the parameter when the character sustains damage from another game element during playback of motion of the character.

Preferably, in switching the motion, when switching to and then playing back one or more motions among the plurality of motions, use is made of motion data stored in advance, different from the motion data defining the motion being played back, as the motion data defining the one or more motions and, when switching to and then playing back another one or more motions among the plurality of motions, the motion data defining the motion being played back and one or more sets of motion data are combined.

Alternatively, preferably, in switching the motion, the motion data defining the motion being played back and another set of motion data are combined by a synthesis rate in accordance with the value of the parameter so as to generate the motion data defining the other motion switched to and then played back.

To achieve the other object, according to a third aspect of the present invention, there is provided a computer readable program product storing a program for a video game to be executed on a computer, wherein the program makes the computer determine a motion playback routine from among a plurality of motion playback routines for playing back motion of a character based on motion data, expressing continuous change of an image of a character in a game, in accordance with a value of a parameter linked with the character when an event occurs in the game having an effect on movement being played back of the character in the middle of playing back motion of the character on a screen based on the motion data and playing back motion based on motion data corresponding to the determined motion playback routine in accordance with the motion playback routine after transition from the motion being played back.

Preferably, the plurality of motion playback routines include a plurality of motion playback routines combining motion data defining a motion being played back with other motion data by different synthesis rates and, in determining a motion playback routine, a motion playback routine using a synthesis rate corresponding to the value of the parameter is determined from among the plurality of motion playback routines for combination.

More preferably, the synthesis rate is determined for each of a plurality of pre-established ranges of values able to be taken by the parameter and, in determining a motion playback routine, a motion playback routine is determined which combines motion data by the synthesis rate established corresponding to the one of the plurality of ranges to which the value of the parameter belongs.

Alternatively, preferably, the plurality of motion playback routines include a plurality of motion playback routines for playing back motions based on corresponding motion data stored in advance different from the motion data defining motion being played back.

Alternatively, preferably, wherein the plurality of motion playback routines include a first motion playback routine for playing back motion based on motion data stored in advance different from the motion data defining motion being played back and a second motion playback routine for processing the motion data stored in advance to generate other motion data and playing back other motion based on the generated other motion data.

More preferably, the motion being played back is played back based on motion data stored in advance and the processing is processing for combining the motion data stored in advance of the motion being played back and at least one other set of motion data.

To achieve the other object, according to a fourth aspect of the present invention, there is provided a computer readable program product storing a program for a video game to be executed on a computer, wherein the program makes the computer update a parameter linked with a character in a game in accordance with progress in the game so that the character changes in accordance with cumulative damage sustained from another game element and recovers in accordance with the elapse of time after sustaining the damage and switch motion being played back to one of a plurality of other motions in accordance with the value of the parameter when the character sustains damage from another game element during playback of motion of the character.

Preferably, in switching the motion, when switching to and then playing back one or more motions among the plurality of motions, use is made of motion data stored in advance, different from the motion data defining the motion being played back, as the motion data defining the one or more motions and when switching to and then playing back another one or more motions among the plurality of motions, the motion data defining the motion being played back and one or more sets of motion data are combined.

Alternatively, preferably, in switching the motion, the motion data defining the motion being played back and another set of motion data are combined by a synthesis rate in accordance with the value of the parameter so as to generate the motion data defining the other motion switched to and then played back.

To solve the still other object, according to a fifth aspect of the present invention, there is provided a game system for playing back motion of a character on a screen based on motion data expressing continuous change of an image of the character, comprising a means for determining a motion playback routine from among a plurality of motion playback routines for playing back motion of a character based on motion data, expressing continuous change of an image of a character in a game, in accordance with a value of a parameter linked with the character when an event occurs in the game having an effect on movement being played back of the character in the middle of playing back motion of the character on a screen based on the motion data and a means for shifting from the motion being played back and playing back motion based on motion data corresponding to the determined motion playback routine in accordance with the motion playback routine.

The present disclosure relates to subject matter contained in Japanese Patent Application No. HEI 11-268449, filed on Sep. 22, 1999, the disclosure of which is expressly incorporated herein by reference in its entirety.

BRIEF DESCRIPTION OF THE DRAWINGS

These and other objects and features of the present invention will become clearer from the following description of the preferred embodiments given with reference to the attached drawings, in which:

FIG. 13 is a view schematically showing a change in a synthesis rate when executing the synthesis;

FIG. 15 is a schematic flow chart of other motion playback control suitable for being executed by the above game console.

DESCRIPTION OF THE PREFERRED EMBODIMENTS

Figure 1:
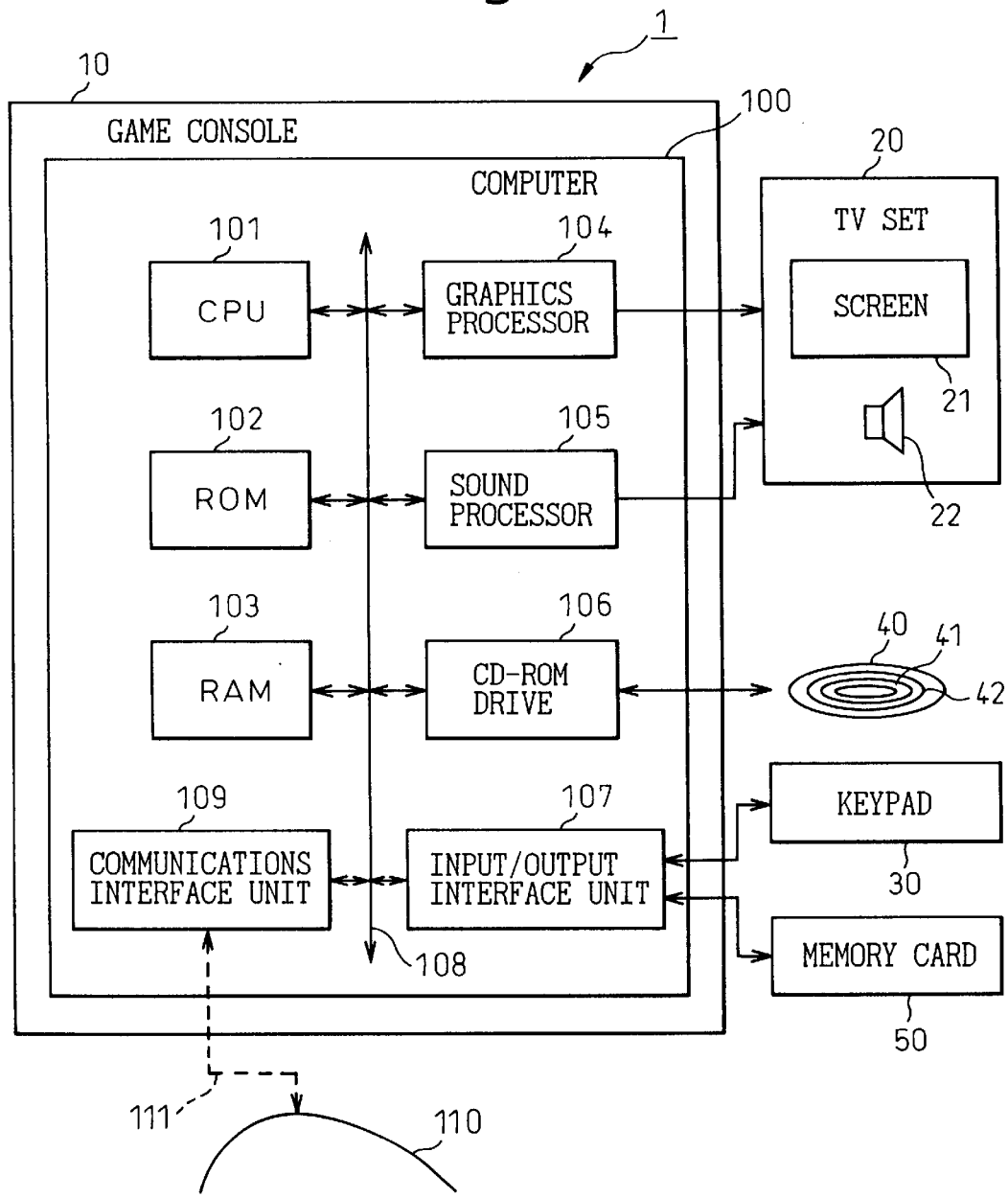
FIG. 1 is a schematic view of a game system using a game console with a built-in computer.

As summarized above, the first aspect of the present invention provides a method of control of playback of motion comprising determining a motion playback routine from among a plurality of motion playback routines for playing back motion of a character based on motion data, expressing continuous change of an image of a character in a game, in accordance with a value of a parameter linked with the character when an event occurs in the game having an effect on movement being played back of the character in the middle of playing back motion of the character on a screen based on the motion data and shifting from the motion being played back and playing back motion based on motion data corresponding to the determined motion playback routine in accordance with the motion playback routine.

According to the method of control of playback of motion of the first aspect of the invention, when an incident occurs in the game having an effect on the movement of a character, the routine for playback of new motion of a character can be determined in accordance with the value of a parameter linked with that character and that new motion can be played back continuing from motion being played back after transition from the motion being played back.

Therefore, during playback of motion of the character, it is possible to shift to motion matching the condition of the character at that time and as a result possible to play back more realistic motion. Note that an incident in a game means an event expressed in the game modeled after the natural world.

Specifically, motion is switched when an incident in the game having an effect on movement of the character occurs during the game while playing back motion of the character. The parameter, in other words, means a parameter linked with the character expressing the condition of the character when that incident occurs.

According to the method of control of playback of motion of the present invention, it is possible to play back motion differing in accordance with the condition of the character for the same incident when an incident having an effect on the movement of the character occurs while playing back motion of the character.

In other words, the motion switched to is motion expressing the character having been affected by the occurrence of the incident in the game. This switching is performed when shifting motion of the character from motion being played back to motion for expressing an effect being received due to occurrence of an incident.

Therefore, the method of control of playback of motion of the present invention can include a step of determining one motion playback routine among a plurality of motion playback routines for playing back different motions expressing a character in a game being affected based on motion data in accordance with a parameter linked with the character due to the occurrence of an incident in a game having an effect on the movement of the character while playing back motion of the character on a screen based on motion data expressing a continuous change of the image of the character or when shifting motion of the character from motion being played back to motion expressing an effect being received in response to the occurrence of the incident and a step of playing back motion expressing an effect being received based on motion data corresponding to the motion playback routine determined at the above step in accordance with the motion playback routine after transition from the motion being played back.

When an incident occurs in the game, motion expressing that effect being received is shifted to the motion being played out of the character and is played back continuing after the motion being played back.

An incident having an effect on the movement of a character is for example an attack on the character from another character. When a character is attacked, the character has to be made to perform new movement such as falling down. Further, there are also land mines buried in the ground in the game and exploding by an increase of characters or special areas set on the surface of the ground which rob a character of physical strength when passing over it. A character touching the land mine or special area is also another example of an incident.

The occurrence of such an incident, in other words, is also the occurrence of an incident in the game having an effect on the condition of a character in question due to other game elements than the character in question, that is, due to factors external to the character. The present invention enables the motion to be shifted to and played back from the motion being played back to be selected when such an incident occurs in accordance with the condition of the character at that time. That is, a motion playback routine for generating motion to be played back after the occurrence of an incident is selected from a plurality of motion playback routines.

The routine is selected in accordance with the value of a parameter, linked to the character, to which the new movement to be performed by the character after the occurrence of the incident relates. Alternatively, the parameter can be linked with the changed movement of the character when an incident occurs.

Here, the parameter linked with another motion or the parameter linked with the changed movement of the character does not have to be a parameter provided only for determining a new motion of a character or determining a changed movement of a character. The parameter linked with new motion or the parameter linked with changed movement of a character may also be parameters used for other purposes. It is sufficient that they be parameters able to be used for determination or selection of motion playback routines for playing back new motion of a character.

More specifically, the parameter is a parameter reflecting the effect on a character from another game element.

Alternatively, the parameter is a parameter linked to the extent by which movement of a character is affected by an incident occurring due to another game element.

In a preferable embodiment of the present invention, the parameter is updated every time a character is affected by another game element.

In a specific embodiment of the present invention, the parameter changes in accordance with the cumulative effect which a character receives from another game element and is updated along with the progress of the game so as to recover in accordance with the elapsed time after being affected.

When the incident is an attack on a character from another game element, the effect of the incident is physical damage sustained by the character. If the condition of the character is changed so that the physical strength of the character is reduced or its fatigue is increased the larger the amount of damage sustained by the character or the greater the number of times damage has been sustained and that condition is made to change in the reverse direction along with the elapse of time after sustaining damage, then the condition of the character becomes more realistic.

In a specific embodiment of the present invention, a parameter having a cumulative damage characteristic is used as the parameter suited to expressing the condition of the character. The cumulative damage characteristic is the characteristic of change of the parameter value for realistically mimicking a change in physical strength or fatigue of a person repeatedly being attacked by another.

Specifically, a cumulative damage characteristic is the characteristic of a change in the parameter value in accordance with the cumulative effect of a plurality of instances of damage sustained by a character in a game due to an attack etc. from another character and of a change in the parameter value so that the parameter value is restored in accordance with the elapsed time after sustaining damage, that is, so that the cumulative value of damage is reduced.

In this specification, a parameter having such a cumulative damage characteristic is referred to as a cumulative damage parameter. A cumulative damage parameter should be a parameter which changes in value in the above way along with the amount of damage sustained by the character and the elapsed time after the character sustains the damage and should be a parameter which is updated in value by other factors as well. That is, it is possible to use a parameter expressing another characteristic of the character as the cumulative damage characteristic as well.

There are several methods for updating the value of the cumulative damage parameter. It is also possible to update the cumulative damage parameter so that it is decreased in value when a character sustains damage and is increased in value in accordance with the subsequent elapse of time. In this case, the cumulative damage parameter mimics for example the physical strength when being repeatedly attacked.

The cumulative damage parameter may also be updated so that it is increased in value when a character sustains damage and is decreased in value along with the subsequent elapse of time. In this case, the cumulative damage parameter mimics the fatigue or stress of a person being repeatedly attacked.

To update the value of a cumulative damage parameter so as to express the cumulative instances of damage sustained by a character, for example the cumulative damage parameter may be updated by exactly a value in accordance with the amount of damage sustained each time damage is newly sustained. More specifically, the cumulative damage parameter may be updated by exactly an amount proportional to the amount of damage newly sustained. The amount of updating may be determined by a nonlinear function of the amount of damage sustained.

The simplest method of updating is to update the cumulative damage parameter by exactly the amount of damage sustained. To update the cumulative damage parameter so as to express recovery from damage along with the elapse of time, the value may be updated each time a predetermined time elapses after the damage is sustained. The simplest method of updating is to update by exactly a predetermined value each time a predetermined time elapses. Of course, the amount of updating may also be determined by a nonlinear function of the elapsed time.

In a specific embodiment of the present invention, a stress value is used as an example of the cumulative damage parameter. The stress value is designed to specifically mimic stress and be able to be updated in value by simple calculation. That is, the stress value is defined so as to be increased by exactly the amount of damage which a character sustains when it sustains damage and to be reduced by exactly a predetermined amount each time a predetermined time elapses after damage is sustained.

More specifically, when a certain character is attacked by another character during playback of a motion A of the character trying to attack the other character and sustains damage, motion in accordance with that stress value is played back right after the transition from the motion A being played back.

For example, when a character sustains large damage of an extent largely changing its direction or position, that movement is made to be reflected on the screen by selecting a motion playback routine of playing back a motion B expressing that large movement and playing back that motion B right after the transition from the motion A being played back.

When a character sustains intermediate damage and the character staggers as well, for the same reasons, a motion playback routine suitable for expressing the movement of the character at that time is selected and that motion C played back right after the transition from the motion A.

On the other hand, when the damage sustained by a character is relatively small and the character staggers only a little, motion of its executing an attack while staggering a little is played back by having a motion playback routine for combining the motions A and D selected and having the new motion obtained by this combination played back right after the transition from the motion A being played back.

In the present invention, the motion playback routines play back motions based on corresponding motion data. For example, one motion playback routine may be a motion playback routine which plays back motion based on motion data stored in advance different from the motion data defining the motion being played back.

Another motion playback routine may be a motion playback routine which processes any motion data to generate motion data different from that motion data and plays back motion based on the generated motion data.

Further, the motion data to be processed may be motion data stored in advance or motion data defining the motion being played back.

In the present invention, a plurality of motion playback routines which play back motion based on different motion data stored in advance are deemed as mutually different motion playback routines. Similarly, a plurality of motion playback routines which apply different processing to the same motion data to generate motion data and play back different motion based on the generated motion data are deemed as mutually different motion playback routines.

In a preferred embodiment of the present invention, the plurality of motion playback routines include a plurality of motion playback routines which play back motion based on corresponding motion data stored in advance different from the motion data defining the motion being played back.

In another preferred embodiment of the present invention, the plurality of motion playback routines include a first motion playback routine for playing back motion based on motion data stored in advance different from the motion data defining motion being played back and a second motion playback routine for processing the motion data stored in advance to generate other motion data and playing back other motion based on the generated other motion data. The processing is preferably processing for combining the motion data stored in advance defining the motion being played back and at least one other set of motion data.

In another preferred embodiment of the present invention, the plurality of motion playback routines include a plurality of motion playback routines for applying different processing to motion data defining motion being played back to generate mutually different motion data and for playing back mutually different motion based on the mutually different motion data generated. A preferred example of the different processing is processing for combining motion data defining the motion being played back and another set of motion data by different synthesis rates.

In another preferred embodiment of the present invention, the plurality of motion playback routines include a plurality of motion playback routines for applying mutually different processing to motion data stored in advance to generate mutually different motion data and for playing back mutually different motion based on that mutually different motion data generated.

In a preferred embodiment of the present invention, the plurality of motion playback routines are determined corresponding to a plurality of predetermined ranges of values able to be taken by the parameter and, in the determining step, a motion playback routine set corresponding to the one of the plurality of ranges to which the value of the parameter belongs among the plurality of motion playback routines is determined.

In another specific embodiment of the present invention, the plurality of motion playback routines includes a plurality of motion playback routines for combining the motion data defining the motion being played back with another set of motion data by different synthesis rates and, in the determining step, a motion playback routine using a synthesis rate in accordance with the value of the parameter among the plurality of motion playback routines for synthesis is determined.

More specifically, the synthesis rate is set in accordance with each of the plurality of predetermined ranges of values able to be taken by the parameter and, in the determining step, a motion playback routine for combination by a synthesis rate set in accordance with one of the plurality of ranges to which the value of the parameter belongs is determined.

A more preferred embodiment of the present invention includes the step of updating a parameter relating to a character in a game in accordance with the progress of the game so that it changes in accordance with the cumulative damage which the character sustains from another game element and is restored along with the elapsed time after the damage is sustained and a step of switching the motion being played back to one of a plurality of motions in accordance with the value of the parameter when the character sustains damage from another game element during playback of motion of the character.

The program product according to the present invention is a computer readable program product storing a program for a video game to be executed on a computer, wherein the program makes the computer determine a motion playback routine from among a plurality of motion playback routines for playing back motion of a character based on motion data, expressing continuous change of an image of a character in a game, in accordance with a value of a parameter linked with the character when an event occurs in the game having an effect on movement being played back of the character in the middle of playing back motion of the character on a screen based on the motion data and playing back motion based on motion data corresponding to the determined motion playback routine in accordance with the motion playback routine after the transition from the motion being played back.

According to the program product of the present invention, it is possible to obtain a program product storing a program which enables determination of the movement to be taken by a character in a game after being attacked by another character in accordance with the value of a parameter linked with the character.

The game system according to the present invention is a game system for playing back on a screen the motion of a character based on motion data expressing a continuous change of the character image, provided with a means for determining a motion playback routine from among a plurality of motion playback routines for playing back motion of a character based on motion data, expressing continuous change of an image of a character in a game, in accordance with a value of a parameter linked with the character when an event occurs in the game having an effect on movement being played back of the character in the middle of playing back motion of the character on a screen based on the motion data and a means for playing back motion based on motion data corresponding to the determined motion playback routine in accordance with the motion playback routine after the transition from the motion being played back.

According to the game system according to the present invention, it is possible to obtain a game system enabling determination of the movement to be taken by a character in a game after being attacked by another character in accordance with the value of a parameter linked with the character.

Also disclosed, in this specification is a computer data signal included in a carrier wave including a program for making a computer execute a step of determining a motion playback routine from among a plurality of motion playback routines for playing back motion of a character based on motion data, expressing continuous change of an image of a character in a game, in accordance with a value of a parameter linked with the character when an event occurs in the game having an effect on movement being played back of the character in the middle of playing back motion of the character on a screen based on the motion data and a step of playing back motion based on motion data corresponding to the determined motion playback routine in accordance with the motion playback routine after the transition from the motion being played back.

Especially preferred embodiments of the method of control of playback of motion according to the present invention and the program product and game system using the same will be explained below with reference to the drawings. Note that below, the same reference numerals indicate the same or similar parts. Further, in the second preferred embodiment on, the points of difference from the first embodiment will mainly be explained.

First Embodiment of Invention

As shown in FIG. 1, the game system 1 is comprised of a game console 10 able to be loaded with a CD-ROM 40 storing a computer game program, a TV set 20, and a keypad 30 able to be operated by a player. The game console 10 is a home game system including a built-in computer. A player pushes a button (not shown) on the game console 10 to open a lid (not shown) and inserts for example a CD-ROM 40 inside. The game console 10 starts to execute a computer game program recorded on the CD-ROM 40. The TV set 20 and the keypad 30 are connected to the game console 10 by cables.

The game console 10 has a card slot (not shown). An external supplementary program product, that is, a memory card 50, may be inserted into the card slot. When the player stops the game in the middle of play, the data relating to the player character and the enemy characters, the data relating to the state of progress of the game program, and other data necessary for resuming the game are stored in the memory card 50 inserted into the card slot. When the player later uses the memory card 50 to restart the game, the game console 10 restarts the game from the interrupted location.

The TV set 20 receives a video signal and audio signal from the game console 10. The TV set 20 processes the received video signal to display a picture on the screen 21 and outputs sound in accordance with the received audio signal to speakers 22 attached to the TV set 20.

The keypad 30 is also known generally as a controller and has a plurality of buttons and other operating portions (not shown) for operation by the player. For example, it is provided with a group of direction keys comprised of four direction keys for moving the cursor displayed on the screen 21 to the left, right, up, and down, a select button, a start button, a first function button, a second function button, a third function button, and a fourth function button. The game system using the present invention is not limited to the one illustrated or ones similar to the same.

The computer 100 is for example comprised mainly of a central processing unit (CPU) 101, a read only memory (ROM) 102 for storing a series of instruction and data required for the CPU 101 to execute program instructions, a random access memory (RAM). 103 for temporarily storing the game program to be executed and the data used by the program and comprising a main memory, a graphics processor 104, a sound processor 105, a CD-ROM drive 106 in which a CD-ROM 40 may be loaded, input/output interface unit 107, communications interface unit 109, and a bus 108 connecting the above circuits.

The CPU 101 decodes and executes the program instructions stored in the RAM 103, controls the circuits in the computer in accordance with the instructions, and controls the execution of the program so as to execute parts of the program corresponding to operational input by a player from the keypad 20 through the input/output interface unit 107 in response to that operational input. The CPU 101 suitably executes the series of instructions stored in the ROM 102 when executing the program instructions.

The graphics processor 104 includes a not shown video RAM (VRAM) and constitutes a frame buffer inside it. It draws an image comprised of polygons in the frame buffer in response to an instruction given from the CPU 101. Further, the graphics processor 104 generates a video signal, in this case a television signal, in accordance with the image data stored in the frame buffer and outputs it to a not shown video circuit in the TV set 20. The sound processor 105 generates an audio signal expressing music, sound effects, etc. based on audio data stored in the RAM 103 and supplies it to speakers 22 through a not shown audio circuit in the TV set 20.

The input/output interface unit 107 is connected to the keypad 30 and the memory card 50 inserted in the card slot (not shown) and controls the timing of the transfer of data between these and the CPU 101 and other circuits. Note that the computer comprising part of the game console according to the present invention is of course not limited to the one illustrated or ones similar to it.

The CD-ROM 40 is a program product storing a game program 41 for making the computer 100 execute the processing according to the present embodiment and the data 42 used by the same. The CD-ROM drive 106 reads the game 41 along with the data 42, stores them in the RAM 103, and uses them for execution by the CPU 101. The program and data used in the game console may also be used for other methods. For example, it is also possible to use the method of including the program in a carrier wave used for transmission and sending and receiving it as a computer data signal for making the computer execute the program.

For example, it is also possible to use a communications interface unit 109 to download the program from other not shown equipment on a network 110 connected via a communications line 111 and use it in the game console 10. Further, it is possible to store the program and data in advance in a memory of other equipment on the network 110 connected with through the communications line 111 and successively store and use that program and data in the RAM 103 through the communications line 111. Note that the game console 10 may also be constituted so as to enable support of only one of such a mode of use and use of a CD-ROM.

The game program is executed by suitable use of other circuits in the computer 100 by the CPU 101. Due to this, various functions intended by the program can be realized. As clear from the following explanation, these functions include a function of determining a motion playback routine, a function of playing back motion, a function of updating a parameter, a function of switching motion, and other functions.

Figure 2:
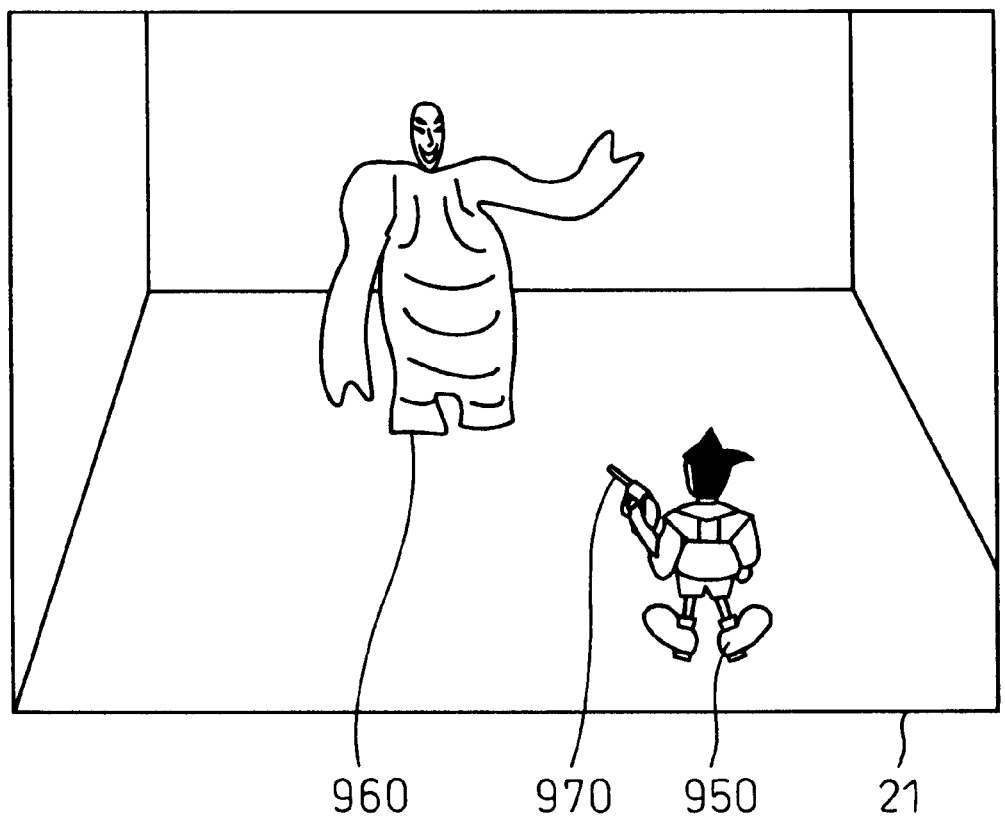
FIG. 2 is a view schematically showing an image of a game displayed by a game program executed by the game console.

FIG. 2 is a view schematically showing a game image displayed by a game program to which the method of control of playback of motion according to the present invention can be applied. A player character 950 and enemy character 960 positioned in a three-dimensional virtual space are displayed on the screen 21. The enemy character 960 is raising its large left arm so as to strike the player character 950. The player character 950 tries to strike back by a gun 970.

The player can operate the keypad 30 (FIG. 1) to control the position of the player character 950 or the timing of attack. Below, an explanation will be given of the related parts of the program, data, and operation of the console when the enemy character 960 is trying to attack the player character 950 and is conversely attacked by the player character 950 using the gun 970.

Figure 3:
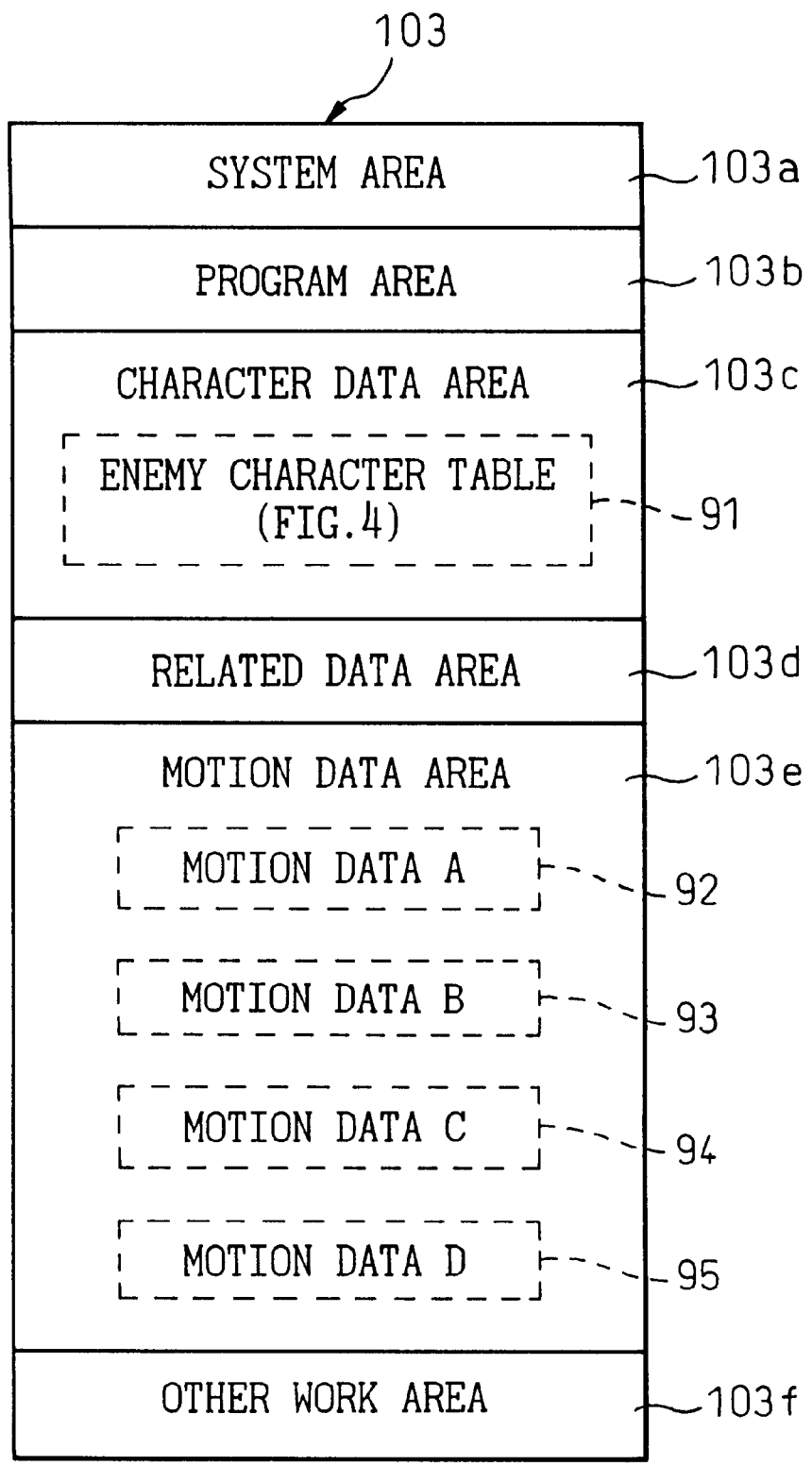
FIG. 3 is a view of an example of a memory map of a RAM in the computer built in the game console.

The RAM 103 is used in accordance with the memory map shown for example in FIG. 3 when executing the game program. The system area 103a stores system information such as an interruption vector showing where an interruption routine jumps to. A program area 103b stores the portion of game program being executed. A character data area 103c stores data relating to the player character 950 and the enemy characters 960 and other characters appearing in the game.

Here, only an enemy character table 91 is shown for simplification of the explanation. A plurality of enemy characters may be present in the game, but here the data and operation relating to only one enemy character 960 will be explained for simplification. A table relating to the player character 950 is also stored in this area, but this will not be illustrated and the explanation will be omitted for simplification.

A related data area 103d stores other related data used for execution of the game program. This data is not directly related to the present invention, however, so explanations thereof will be omitted. A motion data area 103e for example stores a plurality of sets of motion data used for playback of movement of the enemy character 960. Here, the motion data A (92), B (93), C (94) and D (95) are assumed as examples of the motion data related to the enemy character 960. The other work area 103f is used as a work area for temporarily holding other data at the time of execution of the game program.

Figure 4:
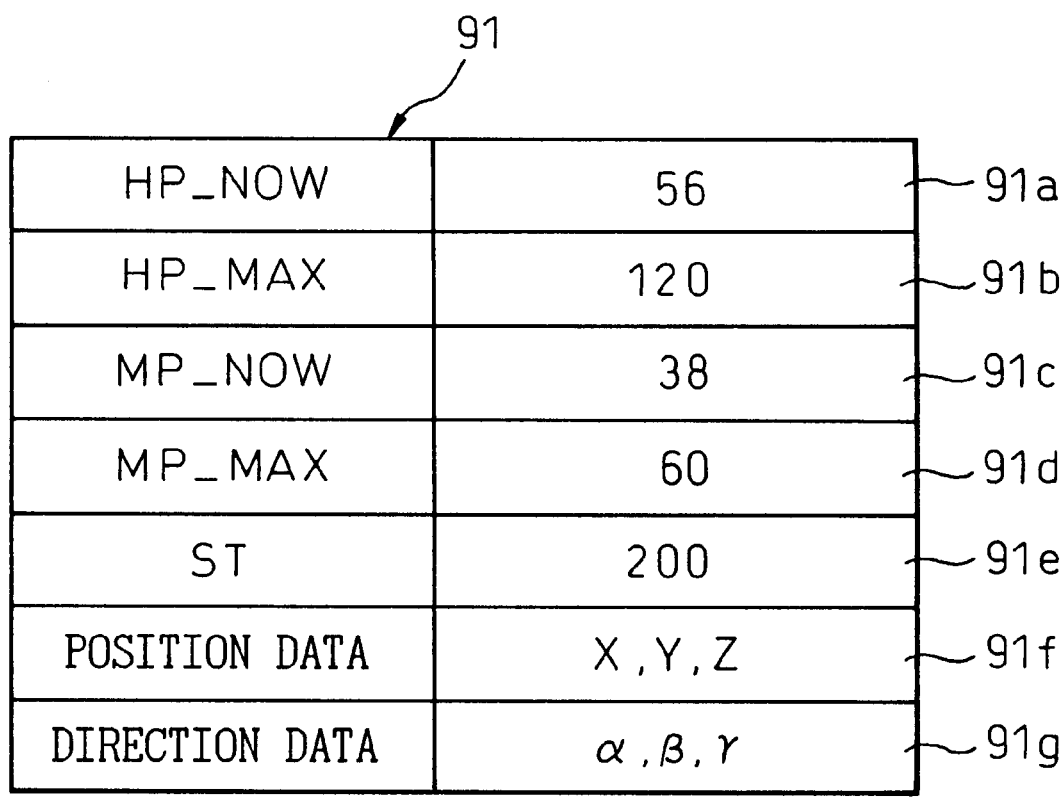
FIG. 4 is a view of the content of an enemy character table suitable for use in the game console.

As shown in FIG. 4, the enemy character table 91 includes current values of various points of an enemy character 960 and maximum values of those points. For example, HP_NOW (91a) and HP_MAX (91b) are the current value of the points expressing the physical strength of the enemy character, called the hit points HP, and the maximum allowable value of the same. The "hit point" is a parameter expressing the physical strength of an enemy character. The hit points are reduced by an attack from another character during a game. Further, the hit points are increased by a predetermined restoration operation of the enemy character. In the example of FIG. 4, the hit points HP_NOW (91a) of the enemy character at the current time are 56 and the maximum value MP_MAX (91b) of the hit points is 120. The game program used in the present embodiment assumes that when the current value HP_NOW of the hit points reaches 0, the enemy character 960 dies. MP_NOW (91c) and MP_MAX (91d) are the current value and maximum allowable value of the magic points MP. The "magic point" is a parameter expressing the amount of magic which an enemy character may use. At the time of the start of a fight, MP_NOW (91c) and MP_MAX (91d) are the same values. MP_NOW (91c) is reduced every time the enemy character uses magic. When MP_NOW (91c) becomes "O", the magic can no longer be used.

Further, the enemy character table 91 includes a parameter distinctive to the present invention, that is, the stress value ST (91e). The parameter is a parameter relating to damage sustained by the enemy character 960 and is an example of a cumulative damage parameter having a cumulative damage characteristic which reflects the cumulative damage sustained and the recovery from the damage along with the elapse of time. In the example of FIG. 4, the value of the stress value ST is 200. Details of the cumulative damage characteristic, the cumulative damage parameter, and the stress value ST will be explained later.

The positional data 91f and directional data 91g are data expressing the position and orientation in three-dimensional space of a reference point of the enemy character 960 (more specifically, a reference point of an object expressing the enemy character comprised of a plurality of polygons). The position of the reference point is expressed by the orthogonal coordinates (X,Y,Z) of the reference point in the virtual space of the game, while the orientation of the enemy character 960 is expressed by the angular coordinates ($\alpha,\beta,\gamma$) expressing the orientation of the enemy character 960 in the same virtual space. These two sets of data are updated by the game program along with the progress of the game. These data are used at the time of playback of motion data as explained later.

In the present embodiment, as will be explained in detail later, when playing back motion of a character, if that character is attacked by another character using a weapon and sustains damage, one of a plurality of motion playback routines is determined in accordance with the value of the stress value ST (91e) linked with that character. New motion is continuously played back after transition from motion being played back based on the determined motion playback routine, whereby the series of movements of the character is displayed on the screen.

The above stress value ST (91e) is an example of a cumulative damage parameter and is defined to specifically mimic the fatigue or stress of a person and be updated in value by simple calculation. That is, the stress value ST is defined to be increased by exactly the amount of damage each time a character sustains damage and to be decreased by exactly a predetermined amount each time a predetermined time elapses.

Figure 5:
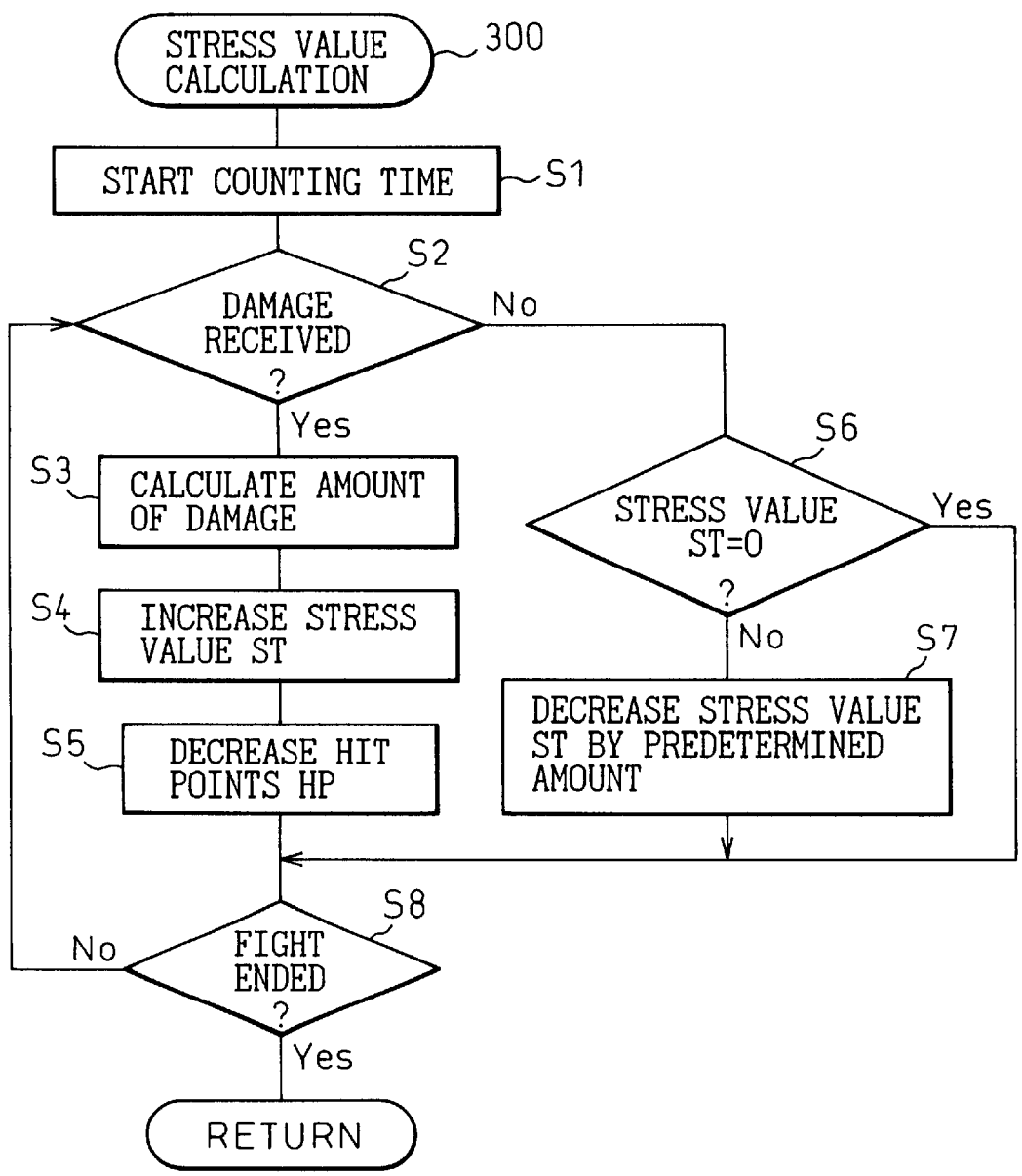
FIG. 5 is a schematic flow chart of stress value calculation included in a game program suitable for being executed by the game console.

The stress value ST of a character (enemy character in the present case) is updated by a stress value calculation 300 shown in FIG. 5. This processing 300 is executed in parallel with the execution of a fight routine while each of a plurality of fight routines included in a main routine of a game program is being executed. That is, when the stress value calculation 300 is started up, a clock operation is started (step S1). Steps S1 to S8 explained below are repeatedly executed every constant period, for example, every time a frame comprising the game screen is switched, for example, every 1/60 second.

First, it is judged if the character in question has sustained damage (step S2). That is, it is judged if it has been effectively attacked by an opposing character in a fight. In the present embodiment, the explanation will be given of the playback of movement of an enemy character and the explanation of the playback of movement for the player character 950 will be omitted. Therefore, in the current set of assumptions, it is judged if the enemy character 960 has been effectively attacked from the player character 950.

A typical attack giving damage is attack by a weapon. In the case of an attack by a gun 970, it is judged at step S2 if a bullet has struck a hit judgment area set for the enemy character 960. When the player character 950 can use magic, attack by magic can also be treated as attack giving damage. Further, in a fighting game, a fighting skill which a player character can use on an enemy character can also be treated as an attack giving damage.

When the enemy character 960 sustains damage, the amount of the damage sustained is calculated (step S3). The following equation 1 is for example used for the calculation:

Amount of damage=basic attack power×rate of attenuation of power    (1)

Here, the basic attack power shows the magnitude of the destructive force by the attack. The rate of attenuation of power is a coefficient expressing the extent of attenuation of the effect of the attack on the enemy character. In the case of an attack by a weapon, it is possible to determine in advance the basic attack power for different types of weapons and possible to determine in advance the rate of attenuation of power so as to decrease along with the increase of the distance from the enemy character to the player character. The relationship of the distance and the rate of attenuation of power can also be changed in accordance with the type of the weapon.

In the case of an attack by magic as well, it is possible to set the basic attack power for each type of magic and possible to determine in advance the rate of attenuation of power from the spatial positional relationship between the enemy character and the player character. In the case of an attack by a fighting skill, it is possible to determine in advance the basic attack power for each fighting skill used and possible to make the rate of attenuation of power in an attack a fixed value.

The stress value ST (91e (FIG. 4) of the enemy character 960 is updated using the amount of damage (step S4). In the present embodiment, the stress value ST is updated so as to be increased by exactly the amount of damage sustained when sustained. The stress value ST is updated so that the effects of a plurality of instances of damage become cumulative in this way.

Further, the current value HP_NOW (91a (FIG. 4) of the hit points of the enemy character 960 is decreased by exactly the amount of damage (step S5). So long as the fight is not judged to have ended (step S8), the flow returns to step S2. The operation from step S2 on is repeated for every switch of an image frame as already explained.

When it is judged at step S2 that the enemy character 960 has not sustained damage, it is judged if the stress value ST (91e (FIG. 4) is "0" (step S6). When the stress value ST is not "0", damage has already been sustained and one frame's worth of time has elapsed from when the stress value calculation 300 was previously executed, so the stress value ST is reduced by a predetermined amount (step S7). Due to this, the effect of the damage is reduced and the stress value ST reduced in accordance with the elapse of time after damage was sustained.

The predetermined amount may be set in relation to the definition of the magnitude of the amount of damage defined by equation 1. Further, it is possible to preset it according to whether it is desired to make the speed of recovery of the stress value ST along with time faster or slower. When it is judged at step S6 that the stress value ST is "0", so long as the fight is not judged to have ended (step S8), the flow returns to step S2. The operation from step S2 on is repeated for every switch of an image frame as already explained. Note that in the stress value calculation 300, the steps S2 on are repeatedly executed every frame, but the method of calculation of the stress value ST is not limited to such a routine. It may also be calculated by the routine shown later as a modification or another routine.

Figure 6:
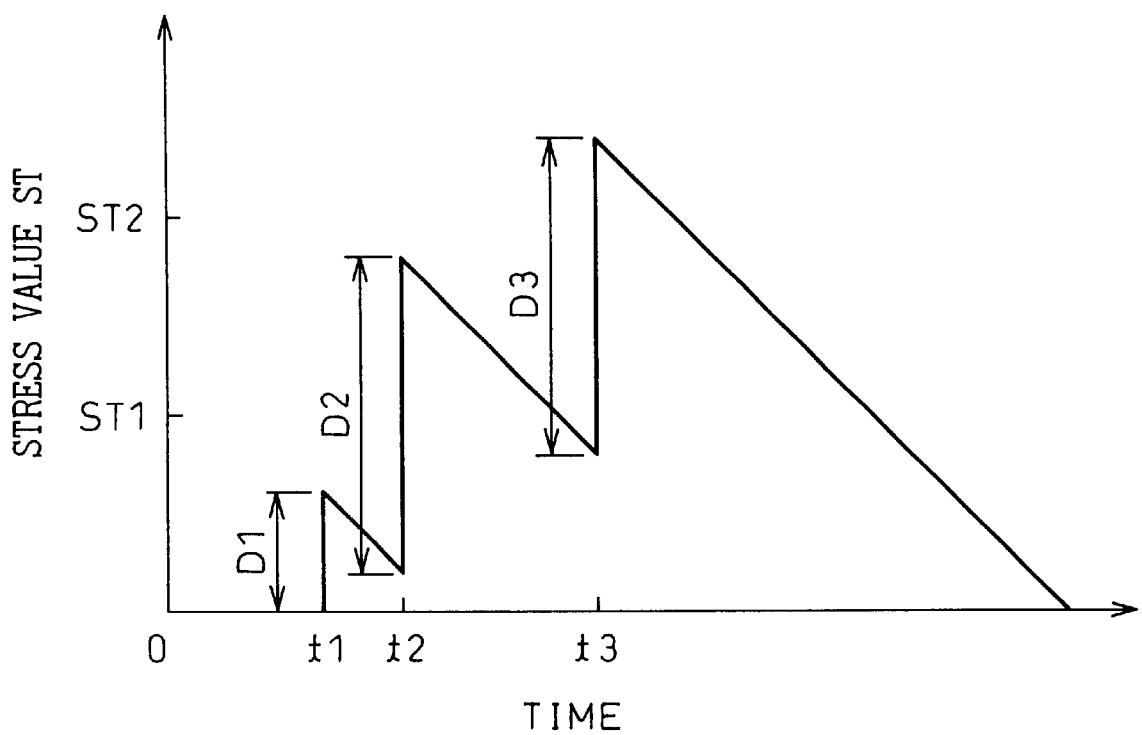
FIG. 6 is a view schematically showing a change in a stress value calculated by the stress value calculation.

The change in the stress value ST becomes for example as shown in FIG. 6. At the times t1, t2, and t3, the stress value ST of the enemy character 960 is increased by exactly the damage of the amounts D1, D2, and D3 each time the enemy character 960 sustains that damage. After the damages are sustained, the stress value ST is reduced along with the elapse of time. As a result, the total amount of damage sustained over the several instances is reflected in the stress value ST.

Here, the amounts of damage D2 and D3 are assumed to be not that different. The stress value ST right after the damage of the amount D3 is sustained at the time t3 reflects the cumulative effect of damage of the amounts D2 and D3 and is considerably larger than the stress value ST right after the damage of the amount D2 is sustained at the time t2. A similar cumulative effect occurs when a plurality of instances of small damage are repeatedly sustained. Even if the amount of damage sustained at one time is small, the stress value ST can become large due to the cumulative effect.

On the other hand, the stress value ST declines proportionally along with the elapse of time after damage is sustained. That is, the stress value ST is restored. Therefore, the stress value ST defined here can be understood to mimic relatively well the stress or physical fatigue of a person. Therefore, by changing the movement of a character in a game using the cumulative damage parameter, more specifically the stress value ST, it is possible to expect the movement of the character to become more realistic.

Figure 7:
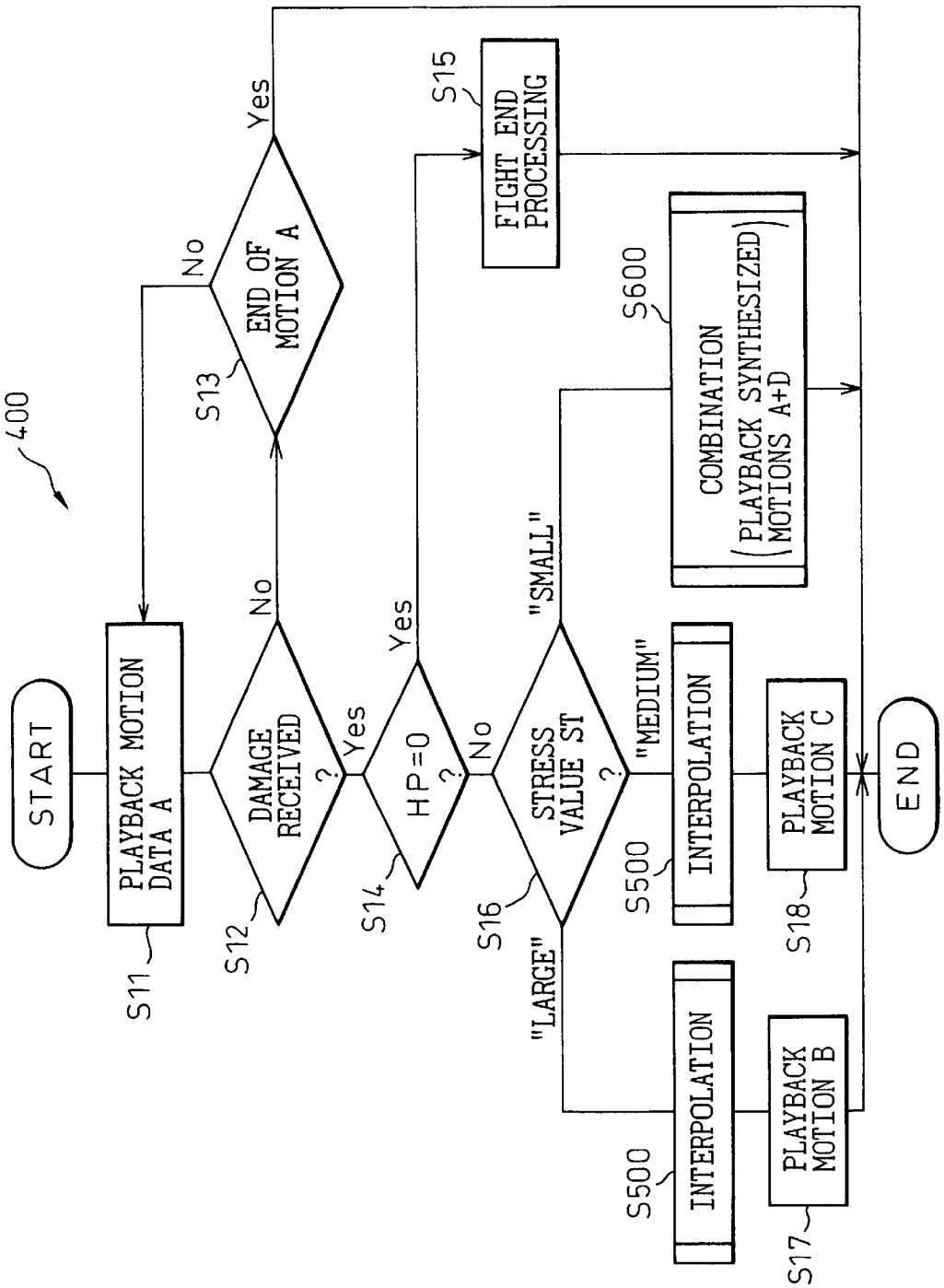
FIG. 7 is a schematic flow chart of motion playback control suitable for being executed by the game console.

Motion is played back in accordance with the motion playback control 400 shown in FIG. 7. First, playback of motion for the enemy character 960 predetermined in accordance with the situation in the game is started (step S11). Below, this motion will be called "motion A". The motion A is played back by reading the motion data A (92) from the motion data area 103e in the RAM 103 and generating an image expressing motion based on that motion data A. The motion is successively played back over a plurality of frames.

It is judged if the enemy character 960 has sustained damage during playback of the motion A (step S12). Whether damage is sustained is judged in the same way as step S2 in the stress value calculation 300 for every frame. When the enemy character 960 has not sustained damage, step S11 of playback and step S12 of judgment of damage sustained are repeatedly executed until it is judged that the motion A has ended (step S13).

Figures 8, 9:
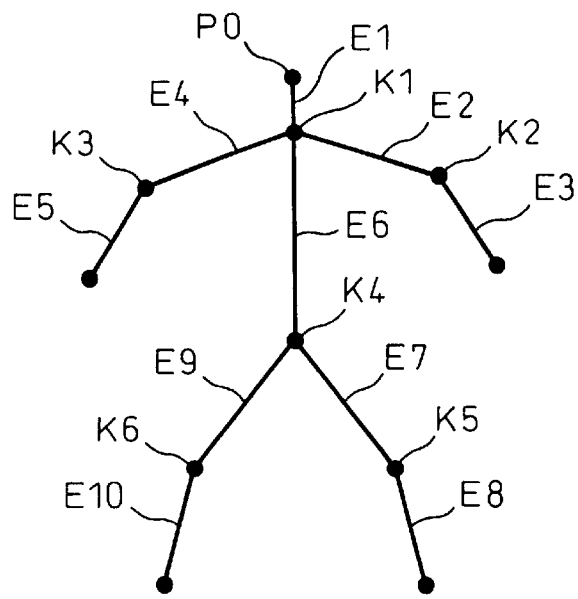
FIG. 8 is a view schematically showing the structure of a skeleton defining motion data suitable for use in the above motion playback control.
FIG. 9 is a view of an example of motion data for the above skeleton.

An example of the motion data able to be used in the present embodiment will be explained below. As shown in FIG. 8, a character is positioned in a three-dimensional local space and is expressed by a skeleton model comprised of a plurality of line arcs E1 to E10 for expressing the head, shoulders, limbs, etc. of the character. These arcs are connected by the joints K1 to K6. For example, the first arc E1 expresses the head, while the arc E2 expresses a shoulder and is connected to the arc E1 by the joint K1. The arc E3 expresses an arm and is connected to the arc E2 by the joint K2.

The positions of polygons are defined corresponding to the arcs, whereby a character comprised of polygons is formed. Of course, other structures may also be used as the skeleton model.

Various methods may be used to designate the positions and directions of the arcs, but here for example the following method is used. Each arc is designated by the position of a reference point and the angle of the arc. The reference point of the arc E1 is the end point P0. The reference point P0 may also be used as the reference point of the skeleton model as a whole. For the reference points of the other arcs, it is possible to use the joints connected to the arcs closest to the arc E1. For example, the reference point of the arc E2 is the joint K1.

As the positional data of the arc E1, the positional coordinates of the reference point P0 in the local space are used. As the angular data of the arc E1, the angular coordinates of the arc E1 in the local space are used. As the positional data and angular data of the other arcs, the relative positional coordinates and relative angular coordinates of the arc at the side closest to the arc E1 (upstream side) are used. That is, the relative position of the reference point of an arc with respect to the reference point of an adjoining arc at the side closer to the arc E1 is used.

Specifically, the difference between the positional coordinates of the reference point of the arc in the local space and the positional coordinates of the reference point of the adjoining arc at the upstream side in the local space is used. For example, as the positional data of the arc E2, the relative position of the joint K1 with respect to the reference point P0 of the arc E1 is used. That is, the differential coordinates between the positional coordinates (X2,Y2,Z2) of the reference point K1 of the arc E2 and the positional coordinates (X1,Y1,Z1) of the reference point P0 of the arc E1 are used.

The relative angle of an arc with respect to the angle of the adjoining arc is used as the angular data of the arc. That is, the differential coordinates between the angular coordinates of the. arc in the local space and the angular coordinates of the adjoining arc in the local space are used. For example, as the angular data of the arc E2, the relative angle of the arc E2 with respect to the angle of the arc E1 is used. That is, the differential coordinates of the angular coordinates ($\alpha$2, $\beta$2,$\gamma$2) of the arc E2 and the angular coordinates ($\alpha$1,$\beta$1,$\gamma$1) of the arc E1 are used.

As explained above, the data relating to each arc is comprised of both positional data and angular data. The two sets of data have a total of six coordinate components. Below, the positional data and angular data for each arc will sometimes be together called "positional/angular data" or simply the "data of an arc" or "arc data". The positional/angular data defined for all arcs making up a skeleton model will sometimes be together called "skeleton data".

When generating an image expressing a character based on the skeleton model, the position and angle of each arc making up the skeleton model in a corresponding virtual space (world space) are determined. That is, the initial arc E1 is arranged in the virtual space based on the positional data 91f (FIG. 4) and directional data 91g (FIG. 4) of the character determined by the game program. That is, the position and angle of the arc E1 in the virtual space are determined in accordance with the positional data 91f and directional data 91g of the enemy character table 91.

As already explained, the positional data and angular data of the arc E2 express the relative positive and relative angle with respect to the arc E1. The position and angle of the arc E2 in the virtual space are determined based on these relative position and relative angle and the position and angle of the arc E1 in the virtual space. The position and angle of the arc E10 are determined in the same way from the other arc E3 in the virtual space. Next, the state of arrangement of a polygon is determined for each of the arcs in the virtual space determined in this way, and the object model expressing the character thereby generated.

Next, the polygons are processed for transparency or other rendering. The shapes and positions on the screen of the plurality of polygons making up the above object model are determined so as to express the character shown in the screen. Further, the object model is processed for texture mapping to assign colors, patterns, etc. to the surfaces of the plurality of polygons making up the character. In this way, an image expressing the condition of the character is generated and displayed on the screen.

The motion data does not have to include skeleton data determined as above for each of all of the frames necessary for playback of a series of movements. The method of including in the motion data skeleton data for predetermined frames (hereinafter called key frames) among the frames necessary for playback of the series of movements and of generating the skeleton data for any frame between two adjoining key frames by interpolating the two sets of skeleton data for these two key frames may also be used in the present embodiment. If such a data structure is used, it is possible to reduce the size of the motion data to be is stored.

FIG. 9 shows the motion data comprised in this way. It includes the positional data 200, for example, (X11,Y11, Z11), and the angular data 201, for example, ($\alpha$11,$\beta$11,$\gamma$11), of the arc E1 for each of the key frame no. 1 to L and includes the positional data 202, for example, (X12,Y12, Z12), and the angular data 203, for example, ($\alpha$12,$\beta$12,$\gamma$12), of the arc E2 as well. The same is true for the other arcs.

Note that when the positional/angular data relating to any of the arcs in a key frame match the positional/angular data relating to the same arc in the directly preceding key frame, the positional/angular data of the former is not included in the motion data. The positional/angular data of the same arc in the latter key frame is used instead. The playback of the motion A at step S11 of FIG. 7 is performed using the above motion data as well.

Returning to FIG. 7, when it is detected by step S12 that an enemy character has sustained damage at any timing during the playback of the motion A, as explained with reference to the stress value calculation 300, the amount of damage is calculated and the stress value ST and hit points HP are updated (step S3 to S5 (FIG. 5). In the motion playback control, it is judged if the updated hit points are "0" (step S14).

When the hit points HP are "0", the enemy character 960 is dead, so at that time the fight end processing S15 is executed. This processing itself has no direct relation to the present invention, so its explanation will be omitted. When the hit points HP are not "0", the stress value ST of the enemy character 960 is read from the enemy character table 91 and that value is checked (step S16).

As already explained, the stress value ST is designed to be updated along with the amount of damage and the elapsed time after the enemy character 960 sustains damage. In the current case, since the enemy character has just sustained damage, the value of the stress value ST is increased by exactly the amount of damage sustained.

In the present embodiment, the motion playback routine is determined in accordance with the stress value ST. Motion different from the motion being played back is played back continuing after the transition from the motion A being played back in accordance with the determined motion playback routine.

More specifically, the values which the stress value ST can take are divided in advance into a plurality of ranges. Which of these ranges the stress value ST falls in is judged and the motion playback routine is selected in accordance with the range to which the stress value ST belongs. For example, three stress ranges "large", "intermediate", and "small" are used.

The range "small" includes stress values smaller than a first threshold ST1. The range "intermediate" includes stress values from the first threshold ST1 to less than a second threshold ST2. The range "large" includes stress values from the second threshold ST2. In the case of the change of stress values illustrated in FIG. 6, the stress values ST right after damage of the amounts D1, D2, and D3 are sustained at the times t1, t2, and t3 belong to the ranges "small", "intermediate", and "large", respectively.

When it is judged at step S16 that the stress value ST of the enemy character 960 belongs to the stress range "large", a motion playback routine for playing back a motion B suitable for displaying the movement of an enemy character having a large stress value is determined and the motion playback routine for playing back the motion B is executed based on that determination (step S17).

The motion B is motion for expressing that the enemy character 960 has been attacked by a gun 970 and is preset to correspond to the case where the damage belongs to the range "large". For example, it is movement where the character ends up falling to the ground.

The playback routine for the motion B reads the motion data B (93) stored in advance in the motion data area 103$e$ (FIG. 3) in the RAM 103 and plays back the motion B based on that motion data. Before playing back the motion B, it performs the interpolation S500 on the motions A and B. This interpolation S500 prevents the motion of the enemy character 960 from abruptly changing from the motion A to B.

Figure 10A:
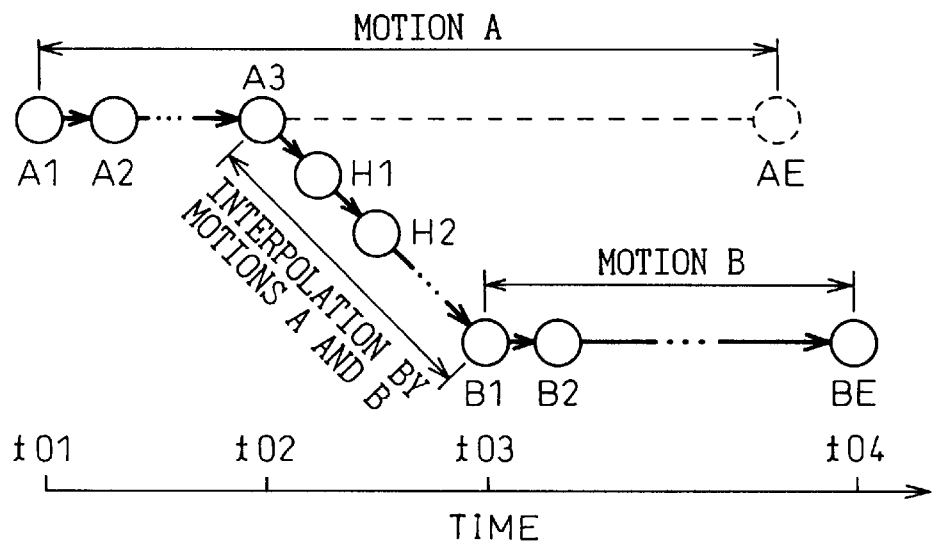
FIG. 10A is a view schematically showing a change along with time in a condition of a character due to the motion interpolation.
Figure 10B:
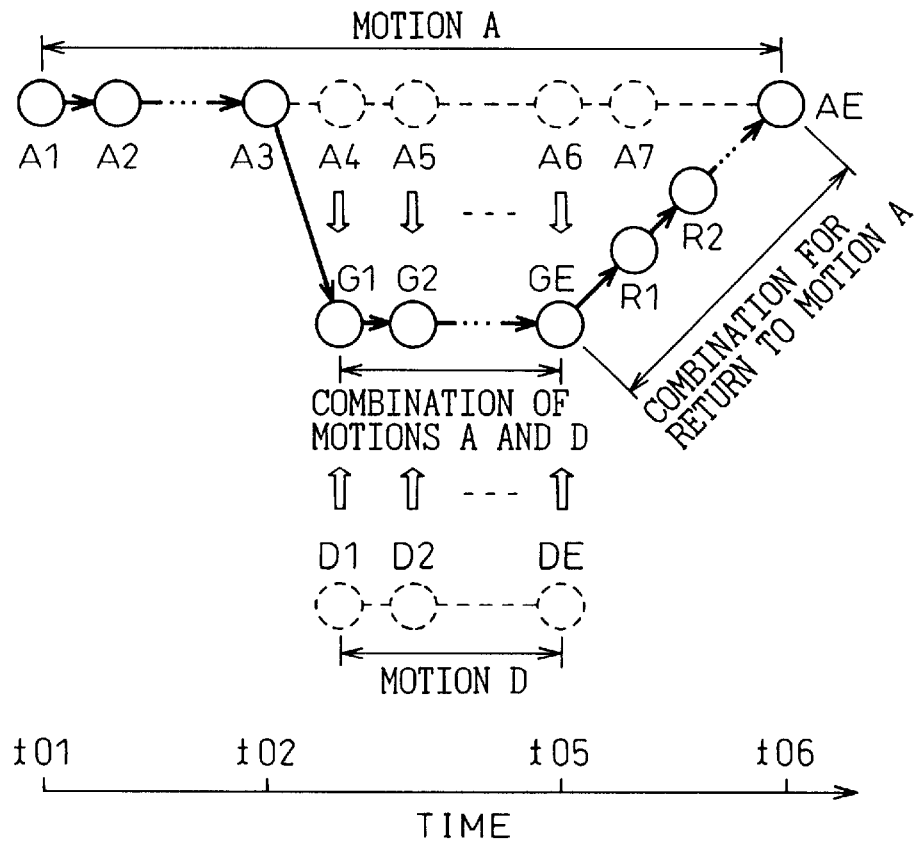
FIG. 10B is a view schematically showing a change along with time in a condition of a character due to the motion synthesis.

FIG. 10A and FIG. 10B schematically show the condition of a character. Referring to FIG. 10A, for example, the movements A1, A2 . . . of the motion A of the enemy character 960 are played back from for example the time t01. When the movement A3 is played back at the time t02, the enemy character is attacked by the player character 950 using the gun 970. When sustaining damage, interpolation S500 is executed on the motions A and B until the time t03 when the time of a predetermined number of frames from the next frame of the time t02 elapses.

Next, the motion B is played out from the initial movement B1 and next movement B2 to the final movement BE during the period from the time t03 to t04. The interpolation S500 is executed between the movement A3 in the motion A when the enemy character 960 sustains damage and the initial movement B1 of the motion B. In the interpolation S500, the image data expressing the movements H1, H2 . . . successively changing from the movement A3 to B1 is generated along with the elapse of time and the corresponding image is displayed. The series of movements including the final movement AE after the movement A3 of the motion A is not displayed.

Figure 11:
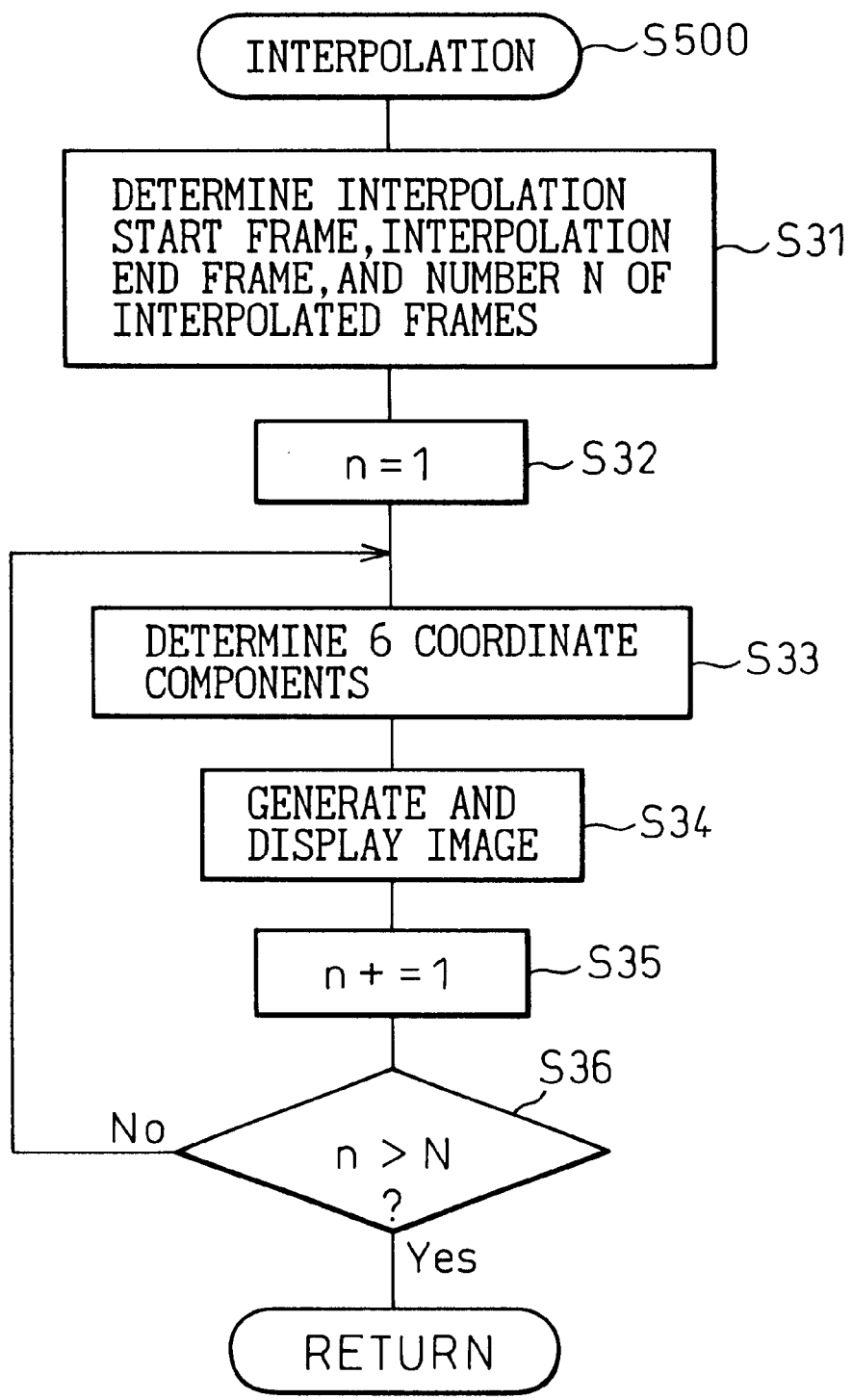
FIG. 11 is a schematic flow chart of interpolation suitable for execution in the motion playback control.

Details of the interpolation S500 are as shown in FIG. 11. The interpolation start frame, the interpolation end frame, and the number N of interpolated frames are determined (step S31). As the interpolation start frame and the interpolation end frame, it is convenient to use the key frames. Therefore, it is convenient to perform step S12 for judging the damage sustained in the motion playback control 400 each time the key frames are played back.

In the present case, the interpolation start frame is the frame displaying the movement A3 of the motion A (FIG. 10A), while the interpolation end frame is the frame showing the initial movement B1 of the motion B (FIG. 10A). The number N of interpolated frames is the total number of interpolated frames. A predetermined value is used for the interpolation. The number N of interpolated frames is for example equal to the number of frames included between a pair of adjoining key frames.

In the interpolation S500, the interpolated frame no. n is set to the initial value "1" (step S32) and the skeleton data of the interpolated frame, that is, the six coordinate components relating to the position and angle of the arcs of the enemy character 960, are found (step S33). The coordinate components are calculated by the following equation 2.

$$Hnei=((N-n){\times}Aei+n{\times}Bei)/N \qquad (2)$$

Here, Hnei is the value of the one coordinate component i relating to the position or angle after interpolation of an arc E for the n-th interpolated frame. Aei is the value of the same coordinate component i of the same arc E in the movement (movement A3 of FIG. 10A in the present case) when sustaining damage of the interpolation start motion A. Bei is the value of the same coordinate component i of the same arc E in the initial movement (movement B1 of FIG. 10A in this case) of the interpolation end motion B.

An image showing the enemy character 960 is generated and displayed using the motion data for the n-th interpolated frame obtained in this way (step S34). At this time, the position data 91f and direction data 91g of the enemy character in the enemy character table 91 (FIG. 4) are used. The image of the character is generated in accordance with the position and direction shown by this data. This was as explained earlier in relation to the motion data.

Next, the interpolated frame no. n is increased by exactly "1" (step S35). The same processing as above is repeated until it is judged that the interpolated frame no. n is larger than the number N of frames (step S36).

Returning to FIG. 7, when it is judged at step S16 that the stress value ST of the enemy character 960 belongs to the stress range "intermediate", a motion playback routine for playing back motion C is determined. The motion playback routine for playing back the motion C is executed based on this determination (step S18).

The motion C is motion for expressing the enemy character 960 being attacked by a gun 970 and is preset to correspond to when the damage is "intermediate". For example, it is motion where the character staggers slightly backward. In the motion D as well, like the motion C, the enemy character 960 staggers backward.

The motion playback routine for playing back the motion C reads the motion data C (94) stored in advance in the motion data area 103e (FIG. 3) in the RAM 103 and plays back the motion C based on the motion data. In the same way as the playback of the motion B, the interpolation S500 of the motions A and C is executed before the playback of the motion C.

The state of the switch from the motion A to the motion C is the same as the switch from the motion A to the motion B. That is, in FIG. 10A, it is sufficient to read the motion B as the motion C and read the movements B1, B2, ... BE as the movements C1, C2, ... CE of the motion C.

Returning to FIG. 7, when it is judged at step S16 that the stress value ST of the enemy character 960 belongs to the stress range "small", a motion playback routine for playing back motion combining the motion A and other motion D is determined. The synthesis S600 is executed based on this determination and the synthesized motion is played back.

The motion D is motion for expressing the enemy character 960 being attacked by a gun 970 and is preset to correspond to when the damage is "small". For example, it is motion where the enemy character 960 staggers slightly backward. In the motion D as well, like the motion C, the enemy character 960 staggers backward, but the extent of stagger of the motion D is smaller than the motion C.

Synthesis S600, as explained in detail below, combines the motion A being played out with the motion D to generate motion for showing the enemy character 960 being attacked by the gun 970. For the motion data defining the motion D, the motion data D (95) stored in advance in the motion data area 103e in the RAM 103 (FIG. 3) is used.

Referring to FIG. 10B, the movements A1, A2, ... of the motion A of the enemy character 960 are played back from the time t01. When the movement A3 is played back at the time t02, the enemy character 960 is attacked by the player character 950 using the gun 970. When sustaining damage, the motions A and D start to be combined from the next frame of the time t02 after sustaining damage and continue being combined until the time t05 corresponding to the frame at which the final movement DE of the motion D is displayed.

In the synthesis, the final movements D1, D2, ... DE. from the start of the motion D are combined with the movements A4, A5, ... AG following the movement A3 of the motion A, the motion data expressing the synthesized movements G1, G2, ... GE are produced, and the corresponding images are displayed.

The synthesis rates of the motions A and D, as explained later, are changed so that the synthesis rate of the motion D successively increases and the synthesis rate of the motion A successively decreases in proportion to the elapse of time. Note that the change in the synthesis rate along with time may of course be suitably modified.

Further, there is no need to synthesize all arcs of the motions A and D by the same rate. In the later explained example, the synthesis rate of the motion A for the two shoulders is made 100% without regard to the elapse of time so that the two shoulders reflect the movements of the motion A without regard as to the elapse of time. The synthesis rate of the motions A and D is changed in accordance with the elapse of time for the other portions of the character.

After the final movement DE of the motion D and the movement AG of the motion A are combined, synthesis is started for returning to the motion A. In this processing, the final movement DE of the motion D and the final movement AE from the movement A7 after the movement AG of the motion A are combined to smoothly return to the motion A, the movements R1, R2, ... AE are played back, and the synthesis ends at the time t06 when the final movement AE of the motion A is combined.

In the synthesis, the final movement DE of the motion D is combined with all of the movements A7 to AE of the motion A. This synthesis is the same as the synthesis of the motion A and motion D explained above except that the synthesis rate of the motion D falls along with time, that of the motion A increases along with time, and, at the end of the synthesis, the synthesis rate of the motion A becomes 100%.

Note that the motion D may be one continuing longer than the motion A. In this case, after the final movement AE of the motion A is combined with a movement of the motion D (this being called the movement Dm here), the movements after the movement Dm of the motion D are combined with the final movement AE of the motion A. As a result, it is possible to smoothly shift from the motion A to D.

Figure 12:
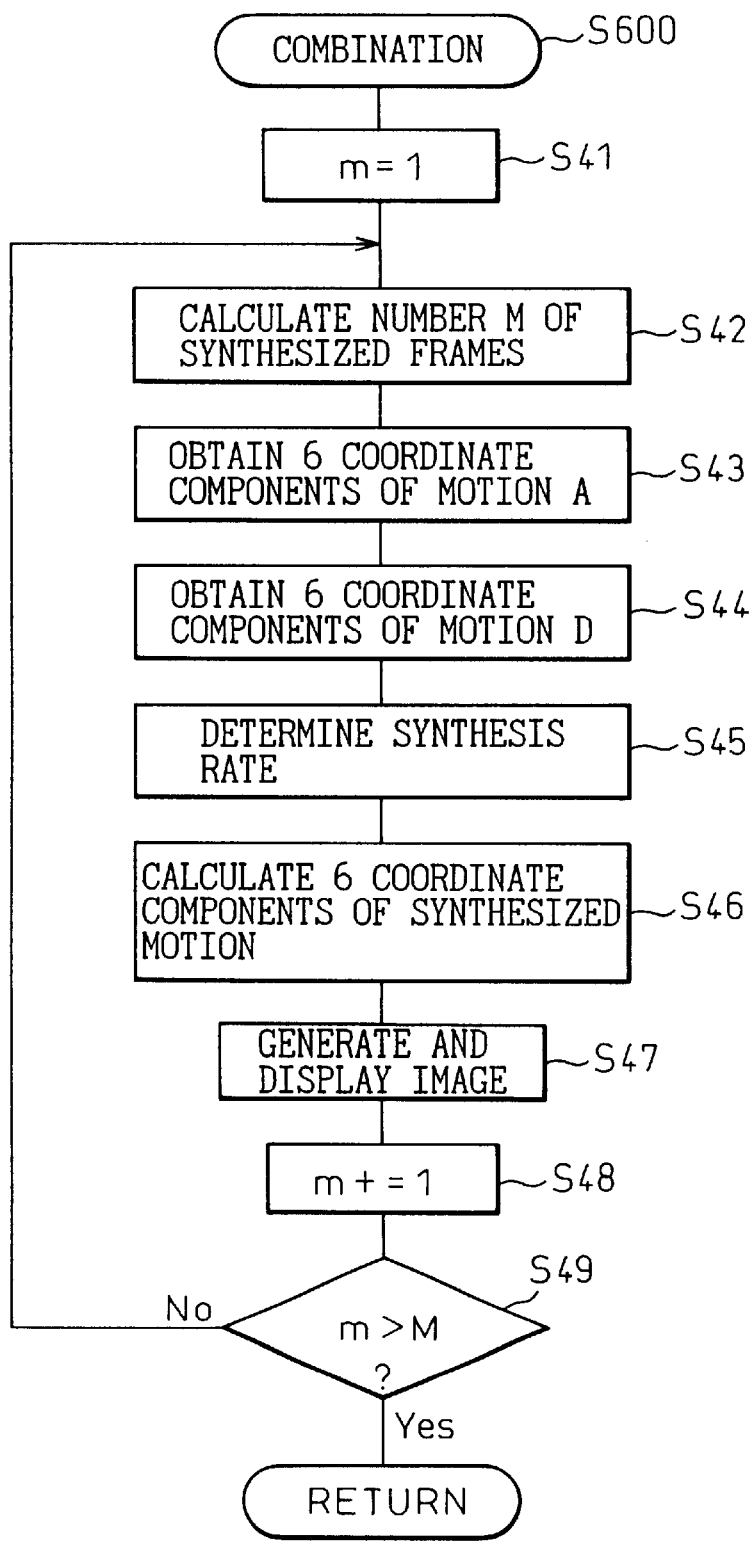
FIG. 12 is a schematic flow chart of synthesis suitable for execution in the motion playback control.

The details of the synthesis S600 are shown in FIG. 12. "1" is set as the initial value of the synthesized frame no. m (step S41). Further, the number M of synthesized frames is calculated (step S42). That is, the smaller of the total number of remaining frames of the motion data A and the total number of frames of the motion data D is selected as the number M of synthesized frames. In the example of FIG. 10B, the total number of frames of the motion data D is selected.

Further, the six coordinate components of each arc of the motion data A to be used for the synthesized frame of the synthesized frame no. m are obtained (step S43). Next, the six coordinate components of each arc of the motion data D to be used for the synthesized frame of the synthesized frame no. m are obtained (step S44).

In the present embodiment, as explained above, the motion data includes arc data for only the key frames and does not include arc data for the frames between pairs of adjoining key frames. When obtaining data of each arc for the motion data A used for the synthesized frame of the synthesized frame no. m at step S43, it is sufficient to obtain the pair of arc data for the pair of adjoining key frames including the arc data to be used for the synthesized frame and calculate by interpolation the arc data used for the intended arc frame from the pair of arc data. The same is true for obtaining the six components of the motion data D at step S44.

Further, in the calculation of the number M of synthesized frames at step S24, the total number of remaining frames of the motion data A is calculated from the total number of frames from the frame to which the initial movement (movement A3 in the case of FIG. 10B) used for synthesis of the motion data A belongs to the next key frame of that frame and the number of frames inside a predetermined key frame. Similarly, the total number of frames of the motion data D is calculated from the product of the total number of key frames of the motion data D and the number of frames in a predetermined key frame.

The synthesis rate T1 of the motion D for the synthesized frame no. m is suitably determined from the number M of synthesized frames obtained at step S42 (step S45). The synthesis rate of the motion A is 1−Ti. Specifically, as shown in FIG. 13, the synthesis rate T1 is increased proportionally in accordance with the synthesized frame no. m. When the synthesized frame no. m changes from 1 to M, the synthesis rate T1 moves in the range of 0 and 1.

T2 shown by the broken line in FIG. 13 expresses the synthesis rate of the motion data D used in the synthesis for returning to the motion A explained above. The synthesis rate T2 falls in proportion to the frame no. between the final value of the synthesis rate T1 and 0.

The six coordinate components for the synthesized motion data A+D are calculated by the following equation 3 from the six coordinate components of the motion data A and D obtained at steps S43 and S44 (step S46).

$$Gmei=(1-T1) \times Amei+T1 \times Dmei \quad (3)$$

Here, Gmei is the value of one coordinate component i of the position or angle of the arc E at the m-th synthesized frame. Amei is the value of the same coordinate component i of the same arc E of the combining motion A used for the synthesis of the m-th synthesized frame. Similarly, Dmei is the value of the same coordinate component i of the same arc E of the motion D to be combined with used for synthesis of the m-th synthesized frame.

The six coordinate components of each arc calculated by equation 3 for the m-th synthesized frame are used to generate and display the image of the character used in the synthesized frame (step S47). At this time, the position data 91f and direction data 91g of the enemy character in the enemy character table 91 (FIG. 4) are used. The image of the character is generated in accordance with the position and direction which the data show. This was as already explained in the description of the motion data. Next, the synthesized frame no. m is increased by exactly "1" (step S48).

The above processing is repeated until it is judged that the synthesized frame no. m is larger than the number M of synthesized frames (step S49). Note that as explained above, synthesis for returning to the motion A is then performed. This processing was already explained and therefore is clear, so the explanation will be omitted for simplification.

Figure 14A:
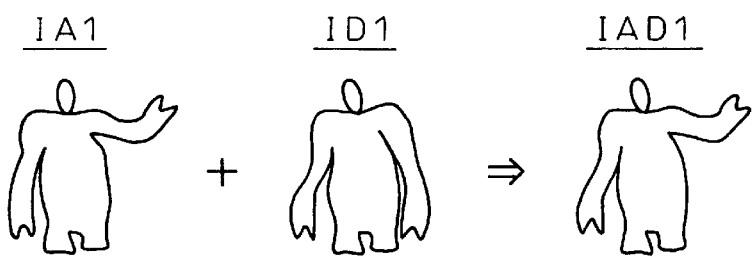
FIG. 14A is a first view schematically showing an image of motion obtained when executing the synthesis.
Figure 14B:
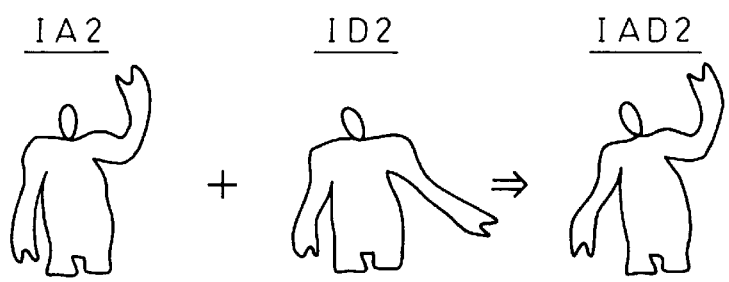
FIG. 14B is a second view schematically showing an image of motion obtained when executing the synthesis.
Figure 14C:
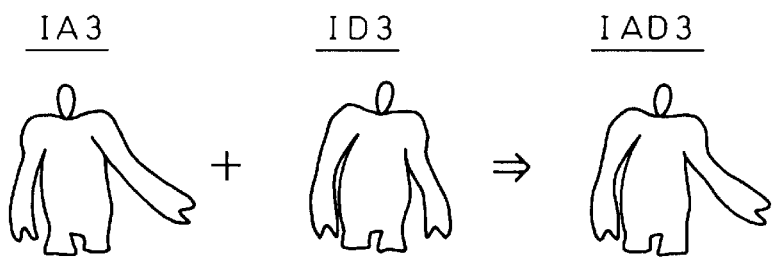
FIG. 14C is a third view schematically showing an image of motion obtained when executing the synthesis.

FIG. 14A, FIG. 14B, and FIG. 14C schematically show examples of the two motions A and D and changes along with time in the motion A+D obtained by combining these. The explanation will proceed using the image of the enemy character 960 displayed on the screen 21. The images IA1 to IA3 show an example of motion A to be combined with and express the movement when the enemy character 960 attacks the player character 950 by its left arm.

The image IA1 is an image showing the left arm being raised. IA2 is an image showing the left arm raised high. IA3 is an image showing the left arm moved down after the movement of the character striking its opponent by its left arm. The images ID1 to ID3 show an example of the motion D to be combined with and express the movement of the enemy character 960 staggering slowly due to being attacked by a weapon by the player character 950.

The image ID1 is an image showing the enemy character 960 staggering slightly in the right hand direction and shows the state of the torso and head being inclined slightly in the right hand direction. The image ID2 is an image showing the enemy character 960 staggering further in the right hand direction and shows the state of the torso and head being inclined further in the right hand direction and the left arm being pushed out in the horizontal direction. The image ID3 is an image showing the enemy character 960 staggering slightly in the left hand direction in a reaction to its staggering in the right hand direction and shows the state of the head and torso being inclined slightly in the left hand direction and the left arm being pushed out slightly more than the image ID2.

Here, assume the case where the enemy character 960 is raising its left arm to try to attack the player character 950 and, when the image IA1 is displayed, is conversely attacked from the player character 950. At that time, the images IA1 to IA3 and the images ID1 to ID3 of the motion D are combined. The images IAD1 to IDA3 show examples of the obtained synthesized images.

In the synthesis example shown here, the motions A and D are combined by a synthesis rate changing along with the elapse of time for only the portions other than the two shoulders of the enemy character 960. The two shoulders of the enemy character 960 are used as they are as the result of synthesis without being combined with the motion D. The synthesis rate of the two shoulders of the motion A is assumed to be 0%.

The synthesized image IDA1 expresses the movement, as shown by the image ID1 of the motion D, of the enemy character shown by the image IA1 of the motion A raising its left arm while staggering a little in the left hand direction due to the effect of the leftward staggering movement of the enemy character. The image IAD2 shows the state when the enemy character further raises its left arm higher for attack as shown by the image IA1 while inclining to the right hand direction as shown in the image ID2. The image IAD3 shows the state when the enemy character inclines slightly to the left hand direction as shown in the image ID3 and lowers its left arm as shown by the image IA3.

As will be understood from the above, the synthesized motion A+D expresses the attacking movement shown by the original motion A plus the staggering movement shown by the motion D. That is, the motion A is partially changed by the motion D. By continuously playing back the synthesized motion A+D from the motion A, it is possible to express the series of motions in accordance with the condition of the character.

As will be understood from the above, in the present embodiment, when one character is attacked by another and sustains damage, motion in accordance with the cumulative damage sustained by the character, that is, the stress value ST, is played back.

That is, in the above embodiment, when a character sustains damage large enough in extent to largely change its orientation and position, this movement is reflected on the screen by selection of a motion playback routine for playing back a motion B expressing this large movement based on motion data stored in advance and the motion B is played back continuing after the transition from the motion A being played back. Since the interpolation S500 is executed in a relatively short time to prevent an abrupt change in the character on the screen, a smoother change can be realized.

When a character sustains intermediate damage and the character staggers as well, a motion playback routine for playing back a motion C suitable for expressing the movement of the character at that time based on motion data stored in advance is selected and the motion C played back continuing after transition from the motion A.

On the other hand, when the damage sustained by a character is relatively small and the character staggers just slightly, a motion playback routine for combining the motions A and D is selected for playing back motion of executing an attack while staggering slightly.

The motion playback routine for playing back the motion B plays back the motion B based on the motion data stored in the RAM 103. The same is true for the motion playback routine for playing back the motion C. Therefore, in the present embodiment, a plurality of motion playback routines for playing back motions defined by the sets of motion data stored in advance in the ROM 103 are used.

Further, the motion playback routine for combining the motions A and D for playing back motion is an example of a motion playback routine for processing the motion data defining the motion A to generate other motion data and playing back motion based on the other motion data. Therefore, the present embodiment includes motion playback routines for playing back motion based on the motion data stored in advance and other motion playback routines for processing motion data defining the motion being played back to generate new motions.

The motion data defining the motion A, however, is stored in advance in the ROM 103 and the motion A played back based on that motion data. Further, the motion data defining the motion D is also stored in advance. Therefore, the motion playback routine combining the motions A and D can be thought of as an example of a motion playback routine for processing the motion data A or D stored in advance to generate other motion data and playing back motion based on the other motion data.

Therefore, in the present embodiment, sometimes two motion playback routines for playing back motion (B or C) based on the motion data stored in advance (B or C) and another motion playback routine for processing motion data stored in advance (A or D) to play back new motion (A+D) are used. In the present embodiment, different motion with a realistic sensation can be expressed by selectively using a plurality of types of motion playback routines in accordance with the condition of the character.

Second Embodiment of Invention

According to a second embodiment of the present invention shown next as well, it is possible to determine the motion play back routine in accordance with the stress value ST and play back other motion in accordance with the stress value instead of the motion being played back. In the motion playback control 400 of FIG. 7, any one of the motion playback for generating and playing back motion B based on the motion data stored in advance after the interpolation S500 of the motions A and B, the motion playback for generating and playing back motion C in the same way after the interpolation S500 of the motions A and C, and the motion playback for the synthesis S600 of the motions A and D is selected in accordance with the value of the stress value ST.

In the motion playback control 400A shown in FIG. 15, however, different motion playback routines are realized by the three syntheses S600A, S600B, and S600C combining the motion A and other motion by different synthesis rates in accordance with the value of the stress value ST. The two motions covered by the processing of these three syntheses are the same for all of the syntheses. The other motion to be combined with may be the same as or different from the motion D shown in the first embodiment, but here the motion to be combined with is called the motion E for simplification.

The synthesis S600A is executed when the stress value ST is judged for example to be "large" and combines the motion A being played back and the other motion E by a 100% synthesis rate. The synthesis rate indicates the synthesis rate of the motion E to be combined with unless otherwise specified. The synthesis S600B is executed when the stress value ST is judged for example to be "intermediate" and combines the motion A being played back and the other motion E by a 50% synthesis rate. The synthesis S600C is executed when the stress value ST is judged for example to be "small" and combines the motion A being played back and the other motion E by a 0% synthesis rate.

In the syntheses S600A, S600B, and S600C, the movement after when the synthesis is started is used for the combining motion A. The motion E to be combined with is used for synthesis from the header condition. This point is the same as the synthesis S600 of the first embodiment of the present invention.

These syntheses of the present embodiment differ on the following point from the synthesis S600 explained in the first embodiment. In the synthesis S600 of the first embodiment, the synthesis rate changes in accordance with the synthesized frame no., that is, the elapse of time after the start of synthesis. In the syntheses S600A, S600B, and S600C of the present embodiment, however, the synthesis rate does not change due to the elapse of time.

From the above explanation, the synthesis S600A becomes synthesis using the motion E itself as the synthesized motion. That is, when the stress value ST when an enemy character sustains damage is relatively large, new motion E is played back instead of the motion A.

Conversely, the synthesis S600C becomes synthesis using the motion A being played back as the synthesized motion. That is, when the stress value ST when an enemy character sustains damage is relatively small, the motion A being played back continues to be played back even when damage is sustained.

On the other hand, the synthesis S600B equally combines the motion A being played back and other motion E. That is, when the stress value ST when an enemy character sustains damage is intermediate, motion obtained by equally combining the motion A being played back and the other motion E is played back continuing after transition from the motion being played back.

In this way, in the present embodiment as well, by just changing the synthesis rate in accordance with the stress value ST, it is possible to generate various motions corresponding to the stress value ST and play them back continuing after transition from the motion being played back. Further, the motion data to be stored need only be the motion data E for the motion E in addition to the motion data A in this case. In the present embodiment, the amount of the motion data to be stored can be reduced from that of the first embodiment.

Note that depending on the combination from synthesis S600A to S600C, it is not necessary to apply the same synthesis rate for all arcs making up the character—in the same way as the case of the synthesis S600 in the first embodiment.

In the present embodiment, the plurality of motion playback routines for combining motions A and E by different synthesis rates for playing backing different motion are examples of the plurality of motion playback routines for applying mutually different processing to the motion data defining the motion A being played back and playing back mutually different motions.

In the present embodiment, however, the motion data defining the motion A is stored in the RAM 103 in advance and the motion A is played back based on that motion data. Further, the motion data defining the motion E is also stored in advance. Therefore, the plurality of motion playback routines for combining the motions A and E by mutually different synthesis rates can also be the examples of a plurality of motion playback routines for applying different processing to the motion data A or E stored in advance to generate a plurality of mutually different sets of motion data and playing back mutually different motions based on the plurality of sets of motion data.

According to the embodiments shown above, when a character sustains damage during playback of motion of the character, one of the plurality of motion playback routines is selected using one of the examples of a cumulative damage parameter having a cumulative damage characteristic, that is, the stress value ST. When using this routine to generate new motion and playing it back after transition from the motion being played back, it becomes possible to play back more realistic motion reflecting the fatigue or stress of the character as it changes during the game.

Further, the present invention is not limited to the special case of an attack by a weapon as explained above and may be applied to an attack by magic as well. Further, the present invention is not limited to an attack and may be generally applied when switching from motion of a character being played back to another motion. That is, the present invention may also be applied to the case of a need arising for switching motion being played back due to factors other than game elements.

Further, even when a need arises for switching motion being played back due to other game elements, the present invention is not limited to attacks and may be generally applied broadly to the case of switching due to the occurrence of an incident in the game affecting the movement of a character while playing back motion of the character.

Further, the present invention is not limited to use of the special parameter called the stress value ST. In the present invention, it is possible to broadly use parameters linked with a character relating to the determination of motion after switching as a parameter. The parameter used in the present invention need not be an exclusive parameter for selection of a motion playback routine according to the present invention or selection of motion after switching. It is also possible to use a parameter used for another purpose. The same applies to the cumulative damage parameter.

Various parameters are already used for a game. These parameters may also be used for the present invention. For example, the hit points HP expressing the physical strength of a character may also be used. A parameter determining the range of magic which a character can use and changing in value depending on the frequency of use of the magic or the type of magic used, that is, magic points, may also be used. Alternatively, it is also possible to use experience data expressing the degree of skill of the player in the game increased each time a fight ends in a win in a fight routine.

Further, parameters expressing various conditions of a character may be used. Even when using a parameter expressing a physical condition of the character, parameters expressing the physical endurance, muscular strength, reflexes, motor skills, etc. may be used. Alternatively, parameters expressing the psychological or mental conditions of the character may be used. Sometimes, parameters expressing the memory, IQ, and other intellectual powers may also be used.

Note that the present invention is not limited to the two embodiments shown above. It is of course also possible to suitably modify or change these embodiments within a range not exceeding their gists.

For example, it is also possible to change the number of motion playback routines used in the embodiments. That is, in the first embodiment, it is possible to reduce the ranges of stress value ST to two and to eliminate one of the two playback routines for playing back the motions B and C. Alternatively, it is also possible to sometimes eliminate the motion playback for playing back new motion by the synthesis S600.

Conversely, it is also possible to increase the number of ranges of the stress value ST and further add another motion playback routine for playing back motion based on another set of motion data stored in advance. Alternatively, it is also possible to increase the number of ranges of stress value ST and add another motion playback routine for combining the motion data A with another set of motion data stored in advance and playing back new motion. In this case, a plurality of motion playback routines for processing the motion data stored in advance and playing back new motion are used.

Similarly, in the second embodiment, a larger number of motions may be produced of course if further adding to the selections synthesis for combination by different synthesis rates from the synthesis rate used in synthesis S600A to S600C. Further, other motion may be produced if changing the synthesis rates used from synthesis S600A to S600C. To smooth the switching of motion, it is also possible to execute the interpolation S500 used in the first embodiment before the synthesis S600A and S600B.

The interpolation and synthesis used in the motion playback control 400 may be combined. Alternatively, other processing may be used instead of the interpolation and synthesis. The structure of the motion data used is also not limited to that explained in the first embodiment and naturally may be another one as well. Further, two sets of motion data were combined in the synthesis used in the above embodiments, but it is also possible to use synthesis for combining three or more sets of motion data similarly using equation 3.

Further, in the above embodiments, the method of playback of new motion for the case of undergoing an attack by a weapon from another character during playback of motion of a character was shown. Depending on the game, however, sometimes a character is attacked by a different weapon from still another character. In this case, it is sometimes desirable to change the subsequent movement of the character in accordance with the type of weapon used for the attack.

In such a case, it is sufficient to prepare a plurality of motion playback routines such as shown in the embodiments in accordance with the types of weapons, judge the, type of the weapon used for the attack in the motion playback control when a character actually is attacked, and determine or select the playback routine for playing back new motion of the character after being attacked in accordance with the combination of the type of the weapon and the value of a parameter linked with the character such as the stress value ST. The already explained land mines or special areas provided on the ground may also be considered examples of different weapons.

Further, depending on the game, the characters sometimes undergo different types of attack from other characters. For example, not only may attacks be made by weapons, but attacks may also be made by magic. Weapons and magic may be considered different types of attack. In such a case, sometimes it is desirable to change the subsequent movement of the character in accordance with the type of the attack.

In such a case, when preparing a plurality of motion playback routines corresponding to the types of attacks as shown in the above embodiments and a character is actually attacked, it is sufficient to judge the type of attack in the motion playback control and determine or select the playback routine for playing back the new motion of the character after being attacked in accordance with the combination of the type of the attack with, for example, the value of a parameter linked with the character such as the stress value ST.

Further, in the same way as the types of weapon, there are various types of magic. The movement of the character when attacked by magic can also differ. In a game where attacks are made by weapons and magic, various weapons are used, and various types of magic are used, the types of weapons and types of magic may be considered types of attacks in the broad sense of the term.

To apply the present invention to such a game, it is sufficient to prepare a plurality of motion playback routines in the above way corresponding to the types of attacks, in the broad sense of the term, to judge the type of the attack in the motion playback control when being attacked, and to determine or select the motion playback routine in accordance with the combination of the type of attack and the value of the parameter linked with the character.

The stress value ST may be calculated by the following flow. Step S2 is executed in the same way as FIG. 5. When it is not detected that damage has been sustained, step S2 is repeatedly executed each time a frame is switched until it is detected that damage has been sustained. When it has been detected that damage has been sustained, the step of storing the time when the damage was sustained is newly executed.

Before or after calculating the amount of damage by step S3, it is judged if the stress value ST from step S6 is "0". When the stress value ST is not "0", the elapsed time from the stored time when the previous damage was sustained to the time which the current damage is sustained is calculated and the stress value ST is reduced by exactly the product of the elapsed time and a predetermined amount. Steps S3 to S5 and S8 of FIG. 5 are executed in the same way, while step S7 is not executed. With this method, the updating step for recovery from the stress value ST along with time may be performed when the damage is sustained the second time on.

The computer comprising part of the game system shown in the above embodiments of the present invention maybe provided with a logic circuit for executing part of the functions of the program used there and may change the program so as to change the method of execution of functions of the program used there along with the same.

In the above embodiments of the present invention, a keypad and output device were provided separate from the game system. One or both of the keypad and output device, however, may be formed integral with the game system. Further, the program product used in the game system may be detachable from the game system or may be built into the game system.

The program product according to the present invention or the program product used in the game system according to the present invention is not limited to a CD-ROM and may be any other computer readable program product. For example, it may be a DVD, magnetic recording medium, semiconductor memory, or other optical recording medium.

In the above embodiments, a home game system was used as the platform, but the game system according to the present invention may also be realized by a personal computer or other general use computer or an arcade machine as a platform. Further, it may be realized using a cellular phone, a portable data terminal, a car navigation system, or other communications terminal as a platform.

Summarizing the effect of the invention, according to the present invention, it is possible to play back motion after the occurrence of an incident in a game in accordance with the value of a parameter linked with the character and thereby possible to play back more realistic motion in accordance with the condition of the character at the time during the progress of the game.

While the invention has been described by reference to specific embodiments chosen for purposes of illustration, it should be apparent that numerous modifications could be made thereto by those skilled in the art without departing from the basic concept and scope of the invention.

What is claimed is:

1. A method of control of playback of motion comprising:
   determining a motion playback routine from among a plurality of motion playback routines for playing back character motion based on prestored motion data, expressing continuous change of a character image in a game, in accordance with a parameter value linked with the character when an event occurs in the game having an effect on character movement being played back on a screen based on said motion data said plurality of motion playback routines including a plurality of motion playback routines combining motion data deforming motion being played back with other motion data by different synthesis rates, the determining further comprising determining a motion playback routine using a synthesis rate corresponding to the value of the parameter from among the plurality of motion playback routines for combination; and
   playing back motion based on motion data corresponding to said determined motion playback routine in accordance with said motion playback routine after transition from said motion being played back.

2. A method of control of playback of motion as set forth in claim 1, wherein
   said synthesis rate is determined for each of a plurality of pre-established ranges of values able to be taken by the parameter and
   in determining a motion playback routine, a motion playback routine is determined which combines motion data by the synthesis rate established corresponding to the one of the plurality of ranges to which the value of the parameter belongs.

3. A method of control of playback of motion as set forth in claim 1, wherein said plurality of motion playback routines include a plurality of motion playback routines for playing back motions based on corresponding motion data stored in advance different from the motion data defining motion being played back.

4. A method of control of playback of motion as set forth in claim 1, wherein said plurality of motion playback routines include:

a first motion playback routine for playing back motion based on motion data stored in advance different from the motion data defining motion being played back and a second motion playback routine for processing the motion data stored in advance to generate other motion data and playing back other motion based on the-generated other motion data.

5. A method of control of playback of motion as set forth in claim 4, wherein the motion being played back is played back based on motion data stored in advance and the processing is processing for combining the motion data stored in advance of the motion being played back and at least one other set of motion data.

6. A method of control of playback of motion comprising:

updating a parameter linked with a character in a game in accordance with progress in the game so that the character changes in accordance with cumulative damage sustained from another game element and recovers in accordance with the elapse of time after sustaining the damage; and switching motion being played back to one of a plurality of other predetermined motions in accordance with the parameter value when the character sustains damage from another game element during playback of character motion.

7. A method of control of playback of motion as set forth in claim 6, wherein, in switching the motion, when switching to and then playing back one or more motions among the plurality of motions, use is made of motion data stored in advance, different from the motion data defining the motion being played back, as the motion data defining the one or more motions and when switching to and then playing back another one or more motions among the plurality of motions, the motion data defining the motion being played back and one or more sets of motion data are combined.

8. A method of control of playback of motion comprising:

updating a parameter linked with a character in a game in accordance with progress in the game so that the character changes in accordance with cumulative damage sustained from another game element and recovers in accordance with the elapse of time after sustaining the damage; and switching motion being played back to one of a plurality of other predetermined motions in accordance with the parameter value when the character sustains damage from another game element during playback of character motion, the switching comprising combining the motion data defining the motion being played back and the other set of motion data by a synthesis rate in accordance with the value of the parameter so as to generate the motion data defining the other motion switched to and then played back.

9. A computer readable program product storing a program for a video game to be executed on a computer, wherein said program makes the computer:

determine a motion playback routine from among a plurality of motion playback routines for playing back character motion based on prestored motion data, expressing continuous change of a character image in a game, in accordance with a parameter value linked with the character when an event occurs in the game having an effect on character movement being played back on a screen based on said motion data, said plurality of motion playback routines including a plurality of motion playback routines combining motion data defining a motion being played back with other motion data by different synthesis rates and the determining further comprising determining a motion playback routine using a synthesis rate corresponding to the value of the parameter from among the plurality of motion playback routines for combination; and play back motion based on motion data corresponding to said determined motion playback routine in accordance with said motion playback routine after transition from said motion being played back.

10. A program product as set forth in claim 9, wherein said synthesis rate is determined for each of a plurality of pre-established ranges of values able to be taken by the parameter and in determining a motion playback routine, a motion playback routine is determined which combines motion data by the synthesis rate established corresponding to the one of the plurality of ranges to which the value of the parameter belongs.

11. A program product as set forth in claim 9, wherein said plurality of motion playback routines include a plurality of motion playback routines for playing back motions based on corresponding motion data stored in advance different from the motion data defining motion being played back.

12. A program product as set forth in claim 9, wherein said plurality of motion playback routines include:

a first motion playback routine for playing back motion based on motion data stored in advance different from the motion data defining motion being played back and a second motion playback routine for processing the motion data stored in advance to generate other motion data and playing back other motion based on the generated other motion data.

13. A program product as set forth in claim 12, wherein the motion being played back is played back based on motion data stored in advance and the processing is processing for combining the motion data stored in advance of the motion being played back and at least one other set of motion data.

14. A computer readable program product storing a program for a video game to be executed on a computer, wherein said program makes the computer:

update a parameter linked with a character in a game in accordance with progress in the game so that the character changes in accordance with cumulative damage received from another game element and recovers in accordance with the elapse of time after receiving the damage; and switch motion being played back to one of a plurality of other predetermined motions in accordance with the parameter value when the character receives damage from another game element during playback of character motion.

15. A program product as set forth in claim 14, wherein, in switching the motion, when switching to and then playing back one or more motions among the plurality of motions, use is made of motion data stored in advance, different from the motion data defining the motion being played back, as the motion data defining the one or more motions and when switching to and then playing back another one or more motions among the plurality of motions, the motion data defining the motion being played back and one or more sets of motion data are combined.

16. A computer readable program product storing a program for a video game to be executed on a computer, wherein said program makes the computer:

update a parameter linked with a character in a game in accordance with progress in the game so that the character changes in accordance with cumulative damage received from another game element and recovers in accordance with the elapse of time after receiving the damage; and switch motion being played back to one of a plurality of other predetermined motions in accordance with the parameter value when the character receives damage from another game element during playback of character motion, the switching comprising combining the motion data defining the motion being played back and the other set of motion data by a synthesis rate in accordance with the value of the parameter so as to generate the motion data defining the other motion switched to and then played back.

17. A game system for playing back motion of a character on a screen based on motion data expressing continuous change of an image of the character, comprising:

a means for determining a motion playback routine from among a plurality of motion playback routines for playing back character motion based on prestored motion data, expressing continuous change of a character image in a game, in accordance with a parameter value linked with the character when an event occurs in the game having an effect on character movement being played back on the screen based on said motion data, the plurality of motion playback routines including a plurality of motion playback routines combining motion data defining motion being played back with other motion data by different synthesis rates, the determining means further comprising determining a motion playback routine using a synthesis rate corresponding to the value of the parameter from among the plurality of motion playback routines for combination; and a means for playing back motion based on motion data corresponding to said determined motion playback routine in accordance with said motion playback routine after transition from said motion being played back.

* * * * *

UNITED STATES PATENT AND TRADEMARK OFFICE
CERTIFICATE OF CORRECTION

PATENT NO.     : 6,614,435 B1
DATED          : September 2, 2003
INVENTOR(S)    : K. Tsujimoto It is certified that error appears in the above-identified patent and that said Letters Patent is hereby corrected as shown below:

Column 30,
Line 38, "deforming" should be -- defining --.

Signed and Sealed this

First Day of June, 2004

JON W. DUDAS
*Acting Director of the United States Patent and Trademark Office*